United States Patent
Iwanari et al.

(10) Patent No.: US 7,506,099 B2
(45) Date of Patent: Mar. 17, 2009

(54) SEMICONDUCTOR STORAGE APPARATUS

(75) Inventors: Shunichi Iwanari, Kyoto (JP); Yasushi Gohou, Osaka (JP); Yoshihisa Kato, Shiga (JP)

(73) Assignee: Panasonic Corporation, Osaka (JP)

( * ) Notice: Subject to any disclaimer, the term of this patent is extended or adjusted under 35 U.S.C. 154(b) by 256 days.

(21) Appl. No.: 11/519,221

(22) Filed: Sep. 12, 2006

(65) Prior Publication Data

US 2007/0061507 A1 Mar. 15, 2007

(30) Foreign Application Priority Data

Sep. 12, 2005 (JP) ............................. 2005-264323

(51) Int. Cl.
*G06F 12/00* (2006.01)
(52) U.S. Cl. ...................... 711/104; 711/113
(58) Field of Classification Search ................. 711/103, 711/104, 113; 365/145
See application file for complete search history.

(56) References Cited

U.S. PATENT DOCUMENTS

| | | | |
|---|---|---|---|
| 4,873,664 A | 10/1989 | Eaton, Jr. | |
| 6,446,177 B1 * | 9/2002 | Tanaka et al. | 711/163 |
| 6,771,531 B2 * | 8/2004 | Nishihara | 365/145 |
| 7,193,923 B2 * | 3/2007 | Nishihara et al. | 365/230.03 |
| 7,248,493 B2 * | 7/2007 | Takashima et al. | 365/145 |
| 2003/0147269 A1 * | 8/2003 | Nishihara | 365/145 |
| 2004/0139282 A1 | 7/2004 | Yoshioka et al. | |
| 2005/0080986 A1 | 4/2005 | Park | |
| 2005/0177679 A1 | 8/2005 | Alva et al. | |

FOREIGN PATENT DOCUMENTS

JP 6-215589 8/1994

* cited by examiner

*Primary Examiner*—Pierre-Michel Bataille
(74) *Attorney, Agent, or Firm*—McDermott Will & Emery LLP

(57) ABSTRACT

A semiconductor storage apparatus comprising: a ferroelectric memory; an SRAM 30; a counter 41; a CAM 10 that judges whether or not a block of data requested to be read out from the ferroelectric memory is stored in the SRAM 30; a storage control unit 51 that, if a result of the judgment is negative, performs a control to read out the requested block of data from the ferroelectric memory and stores a copy of the read-out block of data into a unit storage area in the SRAM 30 that corresponds to the count value indicated by the counter 41; and a counter control unit 52 that causes the counter 41 to update the count value each time a result of the judgment is negative.

18 Claims, 16 Drawing Sheets

SEMICONDUCTOR STORAGE APPARATUS

BACKGROUND OF THE INVENTION (1) Field of the Invention

The present invention relates to a semiconductor storage apparatus.

(2) Description of the Related Art

Some semiconductor storage apparatuses use a ferroelectric memory. The ferroelectric memory is a nonvolatile memory using the remnant polarization of a ferroelectric film as a data storage means (see U.S. Pat. No. 4,873,664). It is known that the life of the ferroelectric memory is closely related to the number of times data is read out. As a technology for extending the life of a semiconductor storage apparatus using a ferroelectric memory, there has been proposed a semiconductor storage apparatus using a cache memory and a ferroelectric memory (for example, Japanese Patent Application Publication No. 6-215589). In this semiconductor storage apparatus, data stored in the ferroelectric memory is partly copied into the cache memory. And data is read out mainly from the cache memory, and only if a desired piece of data is not stored in the cache memory (only if a cache mishit occurs), the desired piece of data is read out from the ferroelectric memory. With this construction, the number of times data is read from the ferroelectric memory is reduced, resulting in the extension of the life of the semiconductor storage apparatus.

Meanwhile, there is one design item to be determined when a cache memory is incorporated into a semiconductor storage apparatus. That is a replacement algorithm. The replacement algorithm is used to determine which existent block of data should be replaced with a new block of data when the cache memory does not have enough space to store the new block of data. The afore-said Japanese Patent Application Publication No. 6-215589 discloses the incorporation of the cache memory, but not the replacement algorithm. Typically used replacement algorithms include LRU (Least Recently Used) and NRU (Not Recently Used) This LRU selects a least recently used block of data, as the block of data to be replaced with a new block of data. The NRU selects a block of data that has not been used recently, as the block of data to be replaced with a new block of data.

However, a problem in achieving such a replacement algorithm is that it is necessary to manage the use state of data stored in the cache memory, which makes the hardware construction complex. For example, in the case of LRU, a need arises to provide a hardware component that arranges blocks of data in the order of the accesses, and rearranges the blocks of data each time data is accessed. Also, in the case of NRU, it is required to have a hardware component that manages the accesses for each block of data, and updates the management information each time data is accessed.

SUMMARY OF THE INVENTION

The object of the present invention is therefore to provide a semiconductor storage apparatus that has a simpler hardware construction than conventional technologies.

The above object is fulfilled by a semiconductor storage apparatus comprising: a ferroelectric memory including a plurality of unit storage areas that store data therein; a cache memory including a plurality of unit storage areas each of which stores a copy of data stored in a unit storage area of the ferroelectric memory, and which are less in number than the plurality of unit storage areas included in the ferroelectric memory; a counter operable to indicate a count value that corresponds to one of the plurality of unit storage areas in the cache memory; a judging unit operable to judge whether or not a block of data requested to be read out from a unit storage area of the ferroelectric memory is stored in a unit storage area of the cache memory, as a copy of the block of data; a storage control unit operable to, if a result of the judgment by the judging unit is negative, perform a control to read out the requested block of data from the ferroelectric memory and store a copy of the read-out block of data into a unit storage area in the cache memory that corresponds to the count value indicated by the counter; and a counter control unit operable to cause the counter to update the count value each time a result of the judgment by the judging unit is negative.

With the above-stated construction, if a cache mishit occurs, the read-out data is stored as a copy into a unit storage area of the cache memory indicated by the counter. That is to say, a block of data in the cache memory to be replaced with a new block of data is determined, regardless of the use state of the data stored in the cache memory. This technology, compared with conventional technologies such as LRU or NRU, simplifies the hardware construction.

In the above-stated semiconductor storage apparatus, the cache memory may have a longer life than the ferroelectric memory on a premise that a life of a memory is determined in accordance with a number of times data is read from the memory.

With the above-stated construction, it is possible to extend the life of the semiconductor storage apparatus. In the above-stated semiconductor storage apparatus, the counter may be an asynchronous counter.

An asynchronous counter is simpler than a synchronous counter in the hardware construction. As a result, with the above-stated construction, it is possible to further simplify the hardware construction of the semiconductor storage apparatus.

The above-stated semiconductor storage apparatus may further comprise: a ferroelectric memory including a plurality of unit storage areas that store data therein; a cache memory including a plurality of unit storage areas each of which stores a copy of data stored in a unit storage area of the ferroelectric memory, and which are less in number than the plurality of unit storage areas included in the ferroelectric memory; and a storage control unit operable to perform a control to store a block of data, which is requested by a rewrite request to be written to the ferroelectric memory, into a unit storage area of the ferroelectric memory, and perform a control to store a copy of the requested block of data into a unit storage area of the cache memory.

With the above-stated construction, a block of data requested by a rewrite request to be written to a memory is always written to the ferroelectric memory as requested, and a copy of the requested block of data is always written to the cache memory, regardless of whether a copy of a block of data to be replaced with the requested block of data has been stored in the cache memory. This eliminates the need to judge whether or not a copy of a block of data to be replaced with the requested block of data has been stored in the cache memory, simplifying the hardware construction. In general, the block of data newly rewritten to the memory is apt to be read out shortly after the rewriting. Accordingly, the above-stated construction, in which a copy of the requested block of data is always written to the cache memory, reduces the possibility that a mishit occurs later. This leads to the extension of the life of the semiconductor storage apparatus. The above-stated construction further stores the requested block of data into the ferroelectric memory, which is a nonvolatile memory, as well as the cache memory. This prevents the data from being deleted by an unexpected blackout or the like.

The above-stated semiconductor storage apparatus may further comprise a judging unit operable to judge whether or not a block of data to be replaced with the requested block of data is stored in a unit storage area of the cache memory as a copy thereof, wherein if a result of the judgment by the judging unit is negative, the storage control unit does not perform a control to store a copy of the requested block of data into a unit storage area of the cache memory.

With the above-stated construction, it is possible to stop storing data into the cache memory if a copy of a block of data, which should be replaced with a requested block of data, has not been stored in the cache memory. This reduces the power consumption in the semiconductor storage apparatus.

The above-stated semiconductor storage apparatus may further comprise: a receiving unit operable to receive a specification of either a power-saving mode or a non-power-saving mode; a judging unit operable to judge whether or not a block of data to be replaced with the requested block of data is stored in a unit storage area of the cache memory as a copy thereof, where in if a result of the judgment by the judging unit is negative and the receiving unit receives specification of the power-saving mode, the storage control unit does not perform a control to store a copy of the requested block of data into a unit storage area of the cache memory.

With the above-stated construction, it is possible to copy a requested block of data into the cache memory when a cache mishit is detected in the execution of a rewrite request. This reduces the possibility that a mishit occurs later. This leads to the extension of the life of the semiconductor storage apparatus. On the other hand, with the above-stated construction, it is also possible not to copy a requested block of data into the cache memory when a cache mishit is detected in the execution of a rewrite request. This makes it possible to stop storing data into the cache memory and reduces the power consumption in the semiconductor storage apparatus. That is to say, the above-stated construction provides a semiconductor storage apparatus that can switch between the power-saving mode and the non-power-saving mode as necessary, where the non-power-saving mode can be selected to put weight on the extension of life, and the power-saving mode can be selected to put weight on the reduction of power consumption. The semiconductor storage apparatus, when used, for example, in a mobile terminal, can be operated in the non-power-saving mode putting weight on the extension of life when the remaining battery level is larger than a predetermined level, and can be operated in the power-saving mode putting weight on the reduction of power consumption when the remaining battery level is smaller than the predetermined level.

The above-stated semiconductor storage apparatus may further comprise: a counter operable to indicate a count value that corresponds to one of the plurality of unit storage areas in the cache memory; a judging unit operable to judge whether or not a block of data to be replaced with the requested block of data is stored in a unit storage area of the cache memory as a copy thereof; and a counter control unit operable to cause the counter to update the count value each time a result of the judgment by the judging unit is negative, wherein if a result of the judgment by the judging unit is positive, the storage control unit performs a control to replace, in the cache memory, the copy of the block of data to be replaced, with a copy of the requested block of data, and performs a control to replace the block of data stored in a unit storage area of the ferroelectric memory, with the requested block of data, and if a result of the judgment by the judging unit is negative, the storage control unit performs a control to store a copy of the requested block of data into a unit storage area of the cache memory that corresponds to the count value indicated by the counter, and performs a control to replace the block of data stored in the unit storage area of the ferroelectric memory, with the requested block of data.

With the above-stated construction, if a cache mishit occurs, the data requested to be rewritten to a memory by a rewrite request is stored as a copy into a unit storage area of the cache memory indicated by the counter. That is to say, a block of data in the cache memory to be replaced with a new block of data is determined, regardless of the use state of the data stored in the cache memory. This technology, compared with conventional technologies such as LRU or NRU, simplifies the hardware construction.

The above object is also fulfilled by a semiconductor storage apparatus comprising: a flash memory; a ferroelectric memory that includes a plurality of unit storage areas in each of which a physical address of the flash memory and a logical address, which correspond to each other, are stored; a cache memory that includes a plurality of unit storage areas in each of which a copy of a physical address of the flash memory and a copy of a logical address are stored with indication of correspondence therebetween, the cache memory including less unit storage areas in number than the ferroelectric memory; a counter operable to indicate a count value that corresponds to one of the plurality of unit storage areas in the cache memory; a judging unit operable to judge whether or not a copy of a logical address specified by a read request requesting to read data from the flash memory is stored in a unit storage area of the cache memory; a storage control unit operable to, if a result of the judgment by the judging unit is negative, perform a control to read out a physical address corresponding to the logical address specified by the read request from the ferroelectric memory, read out the requested data from the flash memory using the read-out physical address, and store a copy of the logical address specified by the read request and a copy of the read-out physical address into a unit storage area in the cache memory that corresponds to the count value indicated by the counter, with indication of a correspondence between the copy of the logical address specified by the read request and the copy of the read-out physical address; and a counter control unit operable to cause the counter to update the count value each time a result of the judgment by the judging unit is negative.

The semiconductor storage apparatus having the above-stated construction uses a flash memory as a storage medium, and stores an address conversion table of the flash memory in a ferroelectric memory. This technology, compared with conventional technologies such as LRU or NRU that need to manage the use state of data, simplifies the hardware construction.

The above object is also fulfilled by a semiconductor storage apparatus comprising: a first memory that stores therein first-type data; a second memory that includes a plurality of unit storage areas in each of which a piece of second-type data, which is used to read out a block of first-type data from the first memory, is stored; a third memory that includes a plurality of unit storage areas in each of which a copy of a piece of second-type data is stored, the third memory including less unit storage areas in number than the second memory; a judging unit operable to judge whether or not a copy of a piece of second-type data specified by a read request requesting to read data from the first memory is stored in a unit storage area of the third memory; and a storage control unit operable to, if a result of the judgment by the judging unit is negative, perform a control to read out a piece of second-type data that is used to read out the requested block of first-type data, from the second memory, read out the requested block of first-type data from the first memory using the read-out piece of second-type data, and store a copy of the read-out piece of second-type data into a unit storage area in the third memory.

The above object is also fulfilled by a semiconductor storage apparatus comprising: a first memory that stores therein first-type data; a second memory that includes a plurality of unit storage areas in each of which a piece of second-type data, which is used to rewrite a block of first-type data stored in the first memory, is stored; a third memory that includes a plurality of unit storage areas in each of which a copy of a piece of second-type data is stored, the third memory including less unit storage areas in number than the second memory; a counter operable to indicate a count value that corresponds to one of the plurality of unit storage areas in the third memory; a judging unit operable to judge whether or not a copy of a block of second-type data to be replaced with a block of second-type data as requested by a rewrite request, is stored in a unit storage area of the third memory; and a storage control unit operable to, if a result of the judgment by the judging unit is positive, perform a control to replace the copy of the block of second-type data stored in a unit storage area of the third memory with a copy of the requested block of second-type data, and performs a control to replace the block of second-type data stored in a unit storage area of the second memory with the requested block of second-type data, and if a result of the judgment by the judging unit is negative, perform a control to store a copy of the requested block of second-type data into a unit storage area of the third memory that corresponds to the count value indicated by the counter, and performs a control to replace the block of second-type data stored in a unit storage area of the second memory with the requested block of second-type data; and a counter control unit operable to cause the counter to update the count value each time a result of the judgment by the judging unit is negative.

The above-stated constructions, compared with conventional technologies such as LRU or NRU that need to manage the use state of data, simplify the hardware construction.

BRIEF DESCRIPTION OF THE DRAWINGS

These and the other objects, advantages and features of the invention will be come apparent from the following description thereof taken in conjunction with the accompanying drawings which illustrate a specific embodiment of the invention. In the drawings.

DESCRIPTION OF THE PREFERRED EMBODIMENT

The following describes preferable embodiments of the present invention with reference to the accompanying drawings.

Embodiment 1

<Construction>

Figure 1:
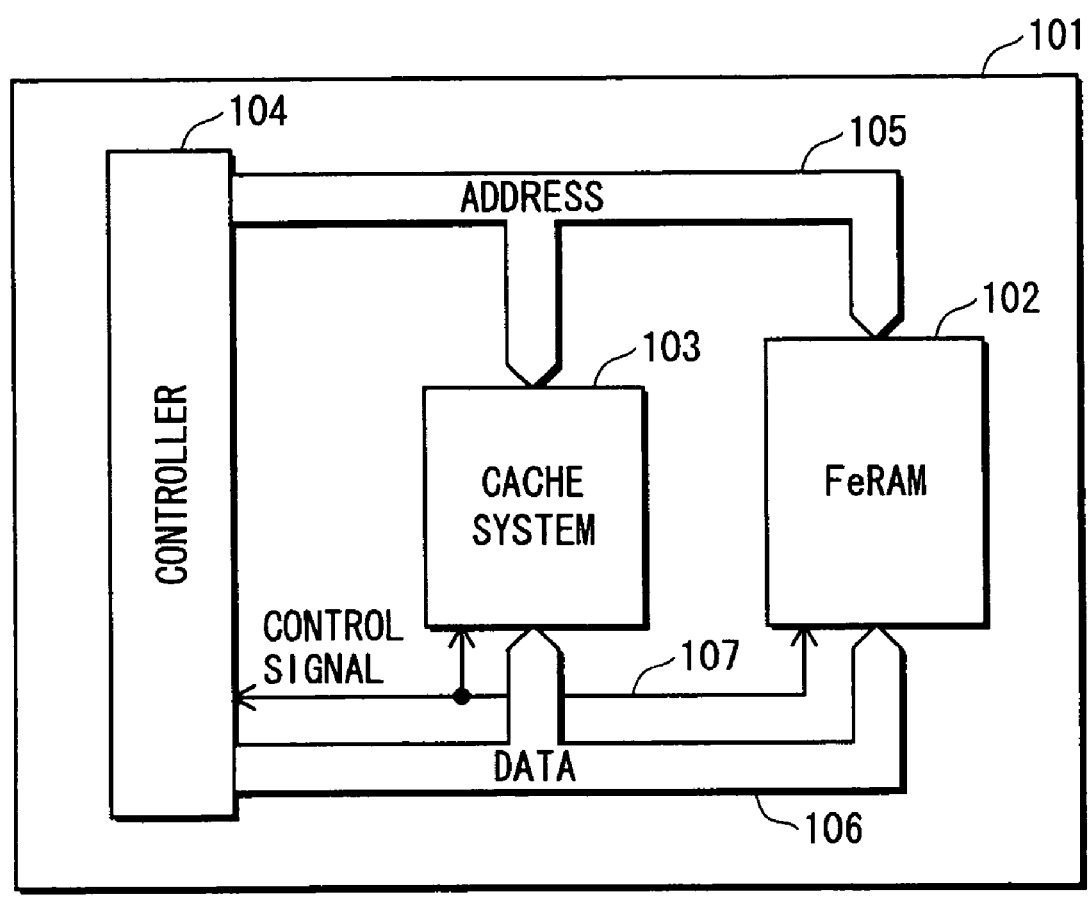
FIG. 1 shows an outline construction of a semiconductor storage apparatus in Embodiment 1.

FIG. 1 shows an outline construction of a semiconductor storage apparatus in Embodiment 1.

A semiconductor storage apparatus 101 includes a ferroelectric memory 102, a cache system 103, a controller 104, an address bus 105, a data bus 106, and a control bus 107. The ferroelectric memory 102, the cache system 103, and the controller 104 are inter-connected by the address bus 105, the data bus 106, and the control bus 107.

The ferroelectric memory 102 includes a plurality of unit storage areas in which data is stored. Upon receiving, via the control bus 107, a control signal representing a read request, the ferroelectric memory 102 outputs data which is stored in a unit storage area that is specified via the address bus 105, via the data bus 106. Also, upon receiving, via the control bus 107, a control signal representing a rewrite request, the ferroelectric memory 102 replaces the data stored in a unit storage area that is specified via the address bus 105, with the data received via the data bus 106.

The cache system 103 includes a plurality of unit storage areas in which a copy of the data stored in the ferroelectric memory 102 is stored. In general, the cache system 103 includes less unit storage areas than the ferroelectric memory 102.

The controller 104 causes the ferroelectric memory 102 and the cache system 103 to perform the reading and rewriting of data.

The operations of the cache system 103 and the controller 104 will be described later.

Figure 2:
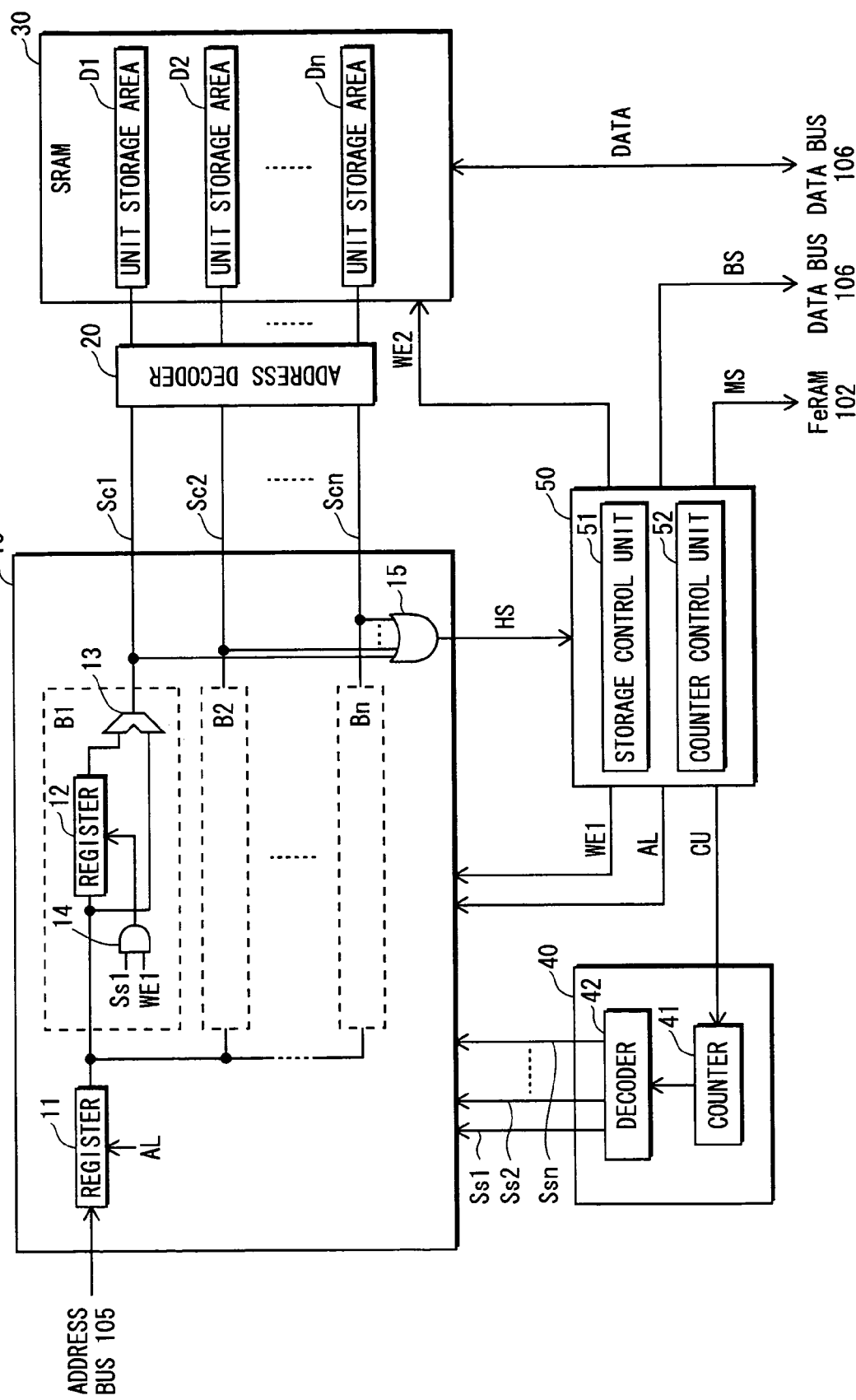
FIG. 2 shows the construction of the cache system 103 in Embodiment 1.

FIG. 2 shows the construction of the cache system 103 in Embodiment 1.

The cache system 103 includes a CAM (Content Addressable Memory) 10, an address decoder 20, an SRAM (Static Random Access Memory) 30, a selection unit 40, and a control unit 50.

The CAM 10 includes a register 11, blocks (B1, B2, . . . Bn), and a logical addition circuit 15.

The register 11 stores address data that is received via the address bus 105. The address data specifies a unit storage area included in the ferroelectric memory 102.

Each of the blocks (B1, B2, . . . Bn) includes a register 12, a comparison circuit 13, and a logical multiplication circuit 14, and has a function to store into the register 12 the address data stored in the register 11, and a function to compare the address data stored in the register 11 with the address data stored in the register 12 to judge whether or not the two pieces of address data match each other. FIG. 2 shows details of block B1 and omits details of the other blocks since the blocks have the same construction. Each block outputs comparison result signals (Sc1, Sc2, . . . Scn) which each indicate whether or not the address data stored in the register 11 matches the address data stored in the register 12. The comparison result signal is output from the comparison circuit 13 of each block. The comparison result signal representing "1" indicates that the comparison result is match, and the comparison result signal representing "0" indicates that the comparison result is unmatch.

The logical addition circuit 15 performs a logical addition on the comparison result signals (Sc1, Sc2, . . . Scn), and outputs the result of the logical addition as a hit signal HS that indicates a cache hit or a cache mishit. The hit signal HS representing "1" indicates a cache hit, and the hit signal HS representing "0" indicates a cache mishit.

The address decoder 20 correlates blocks (B1, B2, . . . Bn) in the CAM 10 with unit storage areas (D1, D2, . . . Dn) in the SRAM 30 on a one-to-one basis.

The SRAM 30 includes unit storage areas (D1, D2, . . . Dn). Each of the unit storage areas (D1, D2, . . . Dn) stores a copy of the data stored in a unit storage area of the ferroelectric memory 102.

The selection unit 40 includes a counter 41 and a decoder 42. The counter 41 is a m-bit counter, and outputs a counter value to the decoder 42, where "m" satisfies the relationship represented by "$n=2^m$". The decoder 42 supplies selection signals (Ss1, Ss2, . . . Ssn) to blocks (B1, B2, . . . Bn) in the CAM 10, respectively. The selection signal representing "1" indicates "selected", and the selection signal representing "0" indicates "not-selected".

The control unit 50 includes a storage control unit 51 and a counter control unit 52. The storage control unit 51 outputs write enable signals WE1 and WE2, a latch signal AL, a mishit occurrence signal MS, and a bus control signal BS. The counter control unit 52 outputs a count-up signal CU.

The write enable signal WE1 indicates for each block whether or not rewriting is permitted. The write enable signal WE1 representing "1" indicates that the rewriting is permitted, and the write enable signal WE1 representing "0" indicates that the rewriting is not permitted.

The write enable signal WE2 indicates whether or not rewriting data to the SRAM 30 is permitted. The write enable signal WE2 representing "1" indicates that the rewriting is permitted, and the write enable signal WE2 representing "0" indicates that the rewriting is not permitted.

The latch signal AL indicates a timing at which the register 11 of the CAM 10 acquires an address from the address bus 105. It is assumed here that the register 11 acquires an address from the address bus 105 when the latch signal AL rises.

The mishit occurrence signal MS is used to notify the ferroelectric memory 102 and the controller 104 that a cache mishit has occurred.

The bus control signal BS is used to control the connection state between the data bus 106, the ferroelectric memory 102, and the SRAM 30.

The count-up signal CU is used to increment the count value of the counter 41.

Figure 3:
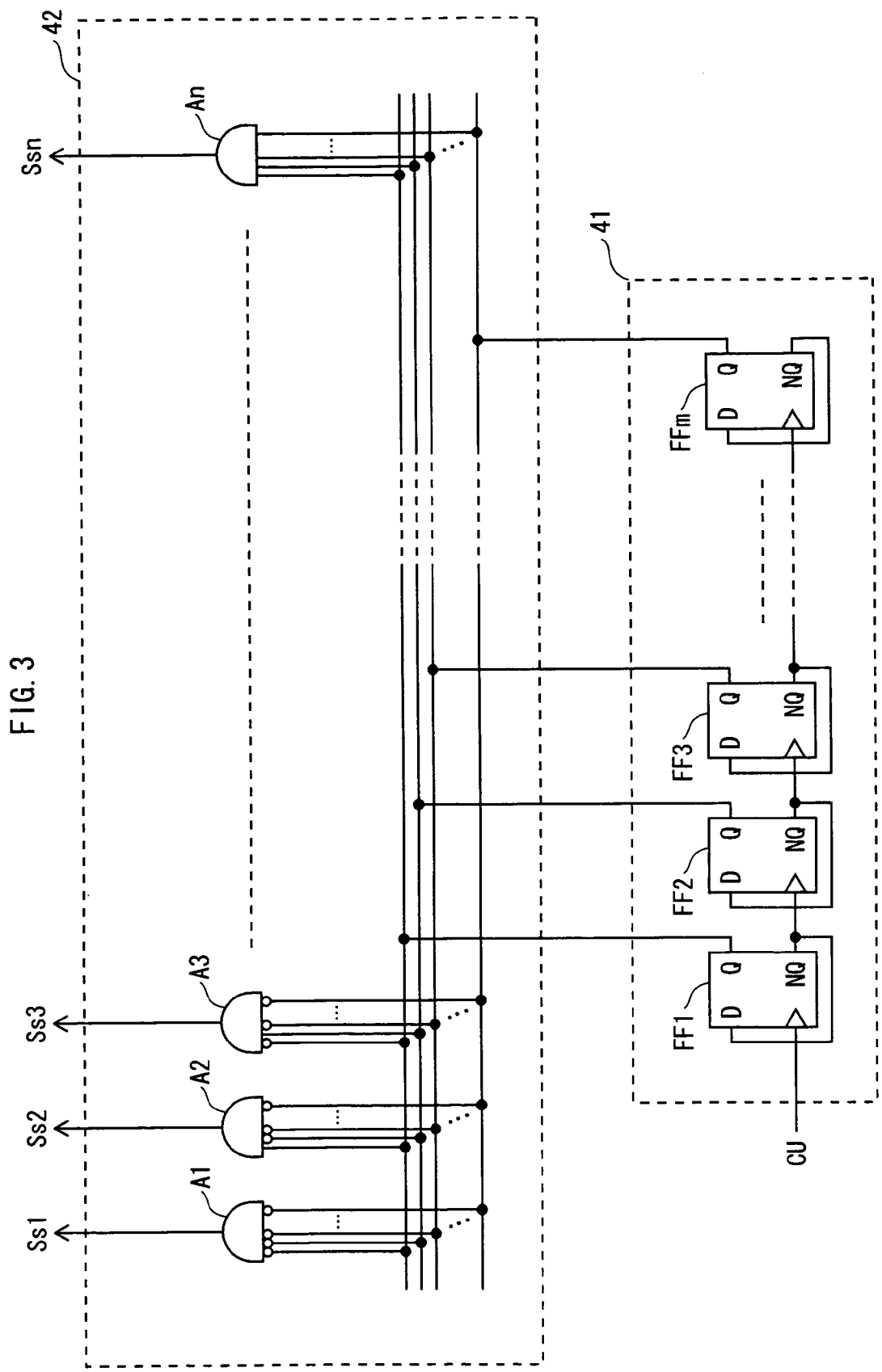
FIG. 3 shows an example of a detailed construction of the selection unit 40.

FIG. 3 shows an example of a detailed construction of the selection unit 40.

The counter 41 is an asynchronous counter including the m number of flip-flops (FF1, FF2, . . . FFm). The decoder 42 includes the n number of logical multiplication circuits (A1, A2, . . . An). With this construction, the selection unit 40 sets one of the selection signals (Ss1, Ss2, . . . Ssn) to "1", and the remaining selection signals to "0". It is also possible to switch the selection signal that is set to "1", from one to another in accordance with a received count-up signal CU.

<Operation>

Figure 4:
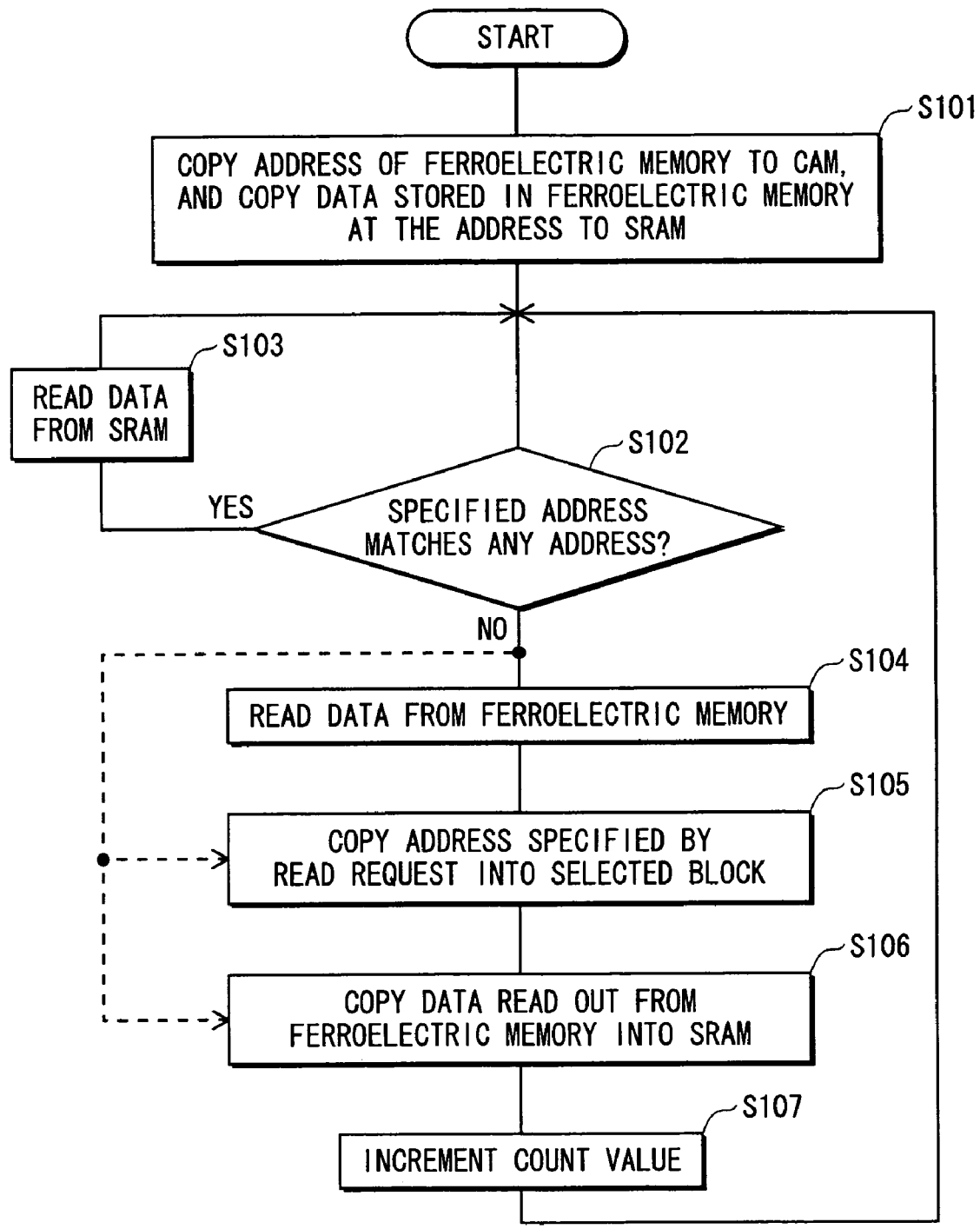
FIG. 4 is a flowchart showing the operational procedure of the semiconductor storage apparatus in Embodiment 1.

FIG. 4 is a flowchart showing the operational procedure of the semiconductor storage apparatus in Embodiment 1.

The semiconductor storage apparatus 101, when it is powered on, copies a predetermined part of data stored in the ferroelectric memory 102 into the cache system 103. To accomplish this, the semiconductor storage apparatus 101 copies a piece of address data that specifies a predetermined unit storage area in the ferroelectric memory 102, into a block in the CAM 10, and the semiconductor storage apparatus 101 copies data stored in the predetermined unit storage area of the ferroelectric memory 102, into a unit storage area of the SRAM 30 (step S101).

Upon receiving a read request, the semiconductor storage apparatus 101 judges whether or not the address data specified by the read request matches any of the address data stored in the blocks of the CAM 10 (step S102).

If it is judged positively (YES in step S102), the semiconductor storage apparatus 101 reads out data from a unit storage area of the SRAM 30 that corresponds to the block storing the address data that matched the address data specified by the read request (step S103).

If it is judged negatively (NO in step S102), the semiconductor storage apparatus 101 reads out data from a unit storage area in the ferroelectric memory 102 that is indicated by the address specified by the read request (step S104).

When it is judged in step S102 that the address data specified by the read request does not match any of the address data stored in the blocks of the CAM 10, the semiconductor storage apparatus 101 further copies the address data specified by the read request into a selected block whose selection is indicated by a selection signal (step S105), and copies the data read out in step S104 into a unit storage area of the SRAM 30 that corresponds to the selected block (step S106).

The semiconductor storage apparatus 101 then increments the count value of the counter 41 (step S107). With this operation, a block different from one having been selected so far is selected. As the semiconductor storage apparatus 101 repeats the above-described operations, the n number of blocks stored in the CAM 10 are selected one by one.

It should be noted here that steps S104, S105, and S106 may be executed in sequence, or may be executed all at once.

The following describes the operation of the semiconductor storage apparatus 101 shown in FIG. 4 in detail with reference to a timing chart.

Figure 5:
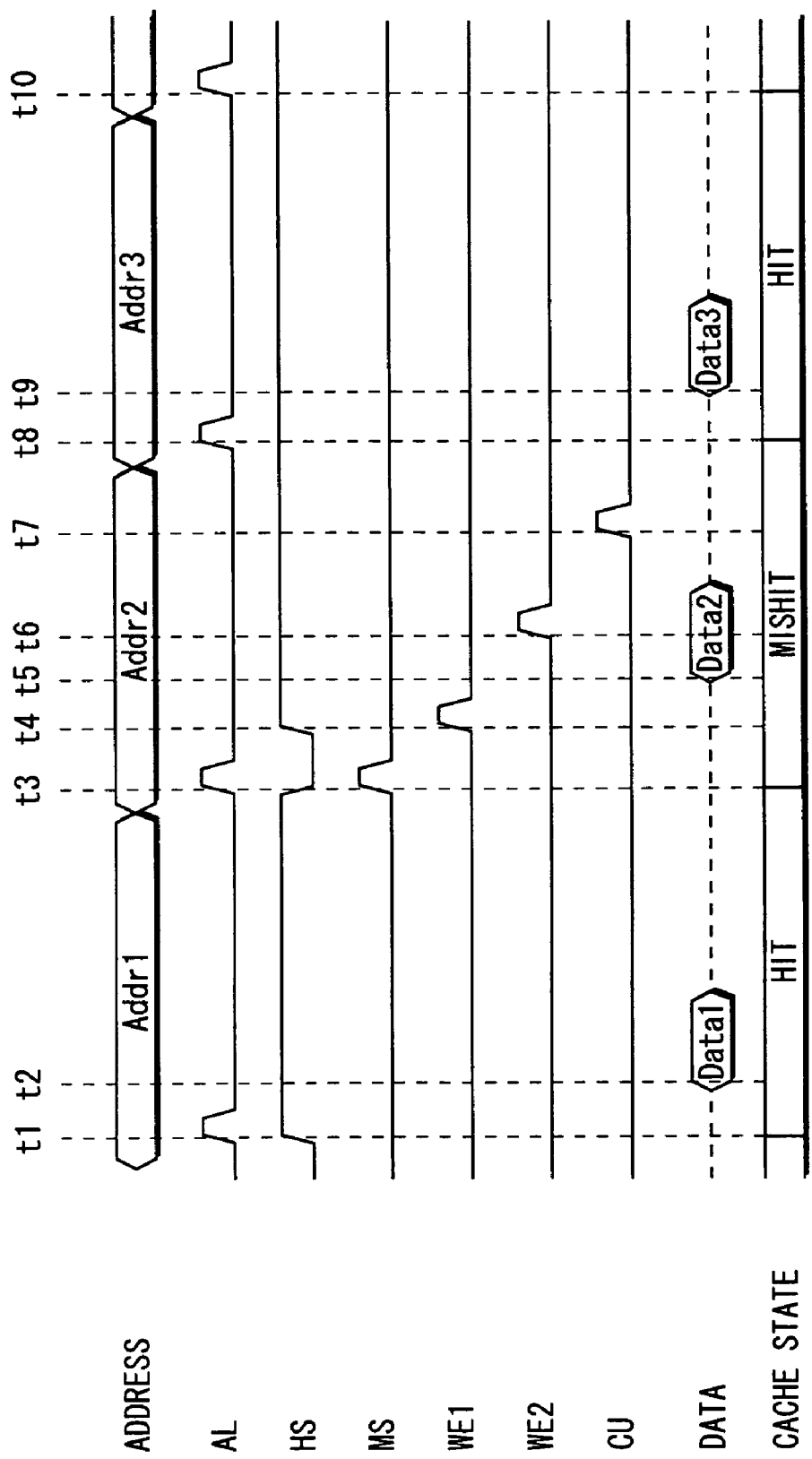
FIG. 5 is a timing chart of the operation performed after the cache system in Embodiment 1 receives a read request.

FIG. 5 is a timing chart of the operation performed after the cache system in Embodiment 1 receives a read request.

Upon receiving a read request, the controller 104 outputs a control signal indicating the read request to the control bus 107. The cache system 103 and the ferroelectric memory 102 receive the control signal and start the reading operation. The controller 104 further outputs the address data specified by the read request to the address bus 105. FIG. 5 shows a sample case in which Addr1, Addr2, and Addr3, which are address data specified by the read request, are received in sequence. It is supposed here that data Data1 and Data3, which respectively correspond to address data Addr1 and Addr3, have been copied in advance into the cache system 103, and that data Data2 corresponding to address data Addr2 has not been copied into the cache system 103.

<Time t1>

At time t1, the latch signal AL rises, and the register 11 acquires address data Addr1 from the address bus 105 and stores the acquired address data therein.

At this point in time, each block in the CAM 10 compares the address data stored in the register 12 with address data Addr1 stored in the register 11, and outputs a comparison result signal (Sc1, Sc2, . . . Scn). At this stage, only a comparison result signal output from a block that stores address data Addr1 represents "1", and the comparison result signals output from the remaining blocks represent "0".

At this stage, the hit signal HS changes to "1" since at least one comparison result signal represents "1".

<Time t2>

At time t2, the address decoder 20 identifies a block from which a comparison result signal representing "1" is output, and specifies a unit storage area in the SRAM 30 that corresponds to the identified block. The SRAM 30, recognizing that the write enable signal WE2 represents "0", outputs data Data1, which is stored in the specified unit storage area, to the data bus 106. The controller 104 acquires data Data1 from the data bus 106, and outputs it to outside.

As explained above, data Data1 is not read out from the ferroelectric memory 102, but is read out from the cache system 103 and then output to outside.

<Time t3>

At time t3, the latch signal AL rises, and the register 11 of the CAM 10 acquires address data Addr2 from the address bus 105 and stores the acquired address data therein.

At this point in time, each block in the CAM 10 compares the address data stored in the register 12 with address data Addr2 stored in the register 11, and outputs a comparison result signal (Sc1, Sc2, . . . Scn). At this stage, there is no block that stores address data Addr2. As a result, all the output comparison result signals represent "0".

At this stage, the hit signal HS changes to "0" as all comparison result signals have come to represent "0".

Recognizing that the hit signal HS has changed to "0", the storage control unit 51 sets the mishit occurrence signal MS to "1". Upon receiving the mishit occurrence signal MS that has changed to "1", the ferroelectric memory 102 is notified that a cache mishit has occurred.

<Time t4>

At time t4, the storage control unit 51 sets the write enable signal WE1 to "1". This causes the register 12 of the selected block, whose selection is indicated by the selection signal, to acquire address data Addr2 stored in the register 11, and store the acquired address data Addr2 therein. The registers 12 of the not-selected blocks, which are not indicated by the selection signal, do not acquire address data Addr2 stored in the registers 11 even if the write enable signal WE1 changes to "1".

When address data Addr2 is stored in the register 12 of any block, the comparison result signal output from the block represents "1" since address data Addr2 stored in the register 11 matches address data Addr2 stored in the register 12.

The address decoder 20 identifies a block from which a comparison result signal representing "1" is output, and specifies a unit storage area of the SRAM 30 that corresponds to the identified block.

Here, the hit signal HS changes to "1" as a comparison result signal has come to represent "1".

<Time t5>

At time t5, the ferroelectric memory 102 outputs, to the data bus 106, address data Addr2 stored in a unit storage area specified by address data Addr2, in response to the change of the mishit occurrence signal MS into "1" at time t3. The controller 104 acquires data Data2 from the data bus 106, and outputs the acquired data Data2 to outside.

<Time t6>

At time t6, the storage control unit 51 sets the write enable signal WE2 to "1". In response to this, the SRAM 30 acquires data Data2 from the data bus 106, and stores the acquired data Data2 into a selected unit storage area.

This enables data Data2 to be copied into the cache system 103 when a cache mishit occurs after a read request is received.

<Time t7>

At time t7, the counter control unit 52 raises the count-up signal CU. In response to this, the counter 41 increments the count value by "1". The block to be selected next is determined by this operation.

<Time t8>

At time t8, the latch signal AL rises, and the register 11 acquires address data Addr3 from the address bus 105 and stores the acquired address data therein.

At this point in time, each block in the CAM 10 compares the address data stored in the register 12 with address data Addr3 stored in the register 11, and outputs a comparison result signal (Sc1, Sc2, . . . Scn). At this stage, only a comparison result signal output from a block that stores address data Addr3 represents "1", and the comparison result signals output from the remaining blocks represent "0".

Here, the hit signal HS changes to "1" as a comparison result signal has come to represent "1".

<Time t9>

At time t9, the address decoder 20 identifies a block from which a comparison result signal representing "1" is output, and specifies a unit storage area in the SRAM 30 that corresponds to the identified block. The SRAM 30, recognizing that the write enable signal WE2 represents "0", outputs data Data3, which is stored in the specified unit storage area, to the data bus 106. The controller 104 acquires data Data3 from the data bus 106, and outputs it to outside.

As explained above, data Data3 is not read out from the ferroelectric memory 102, but is read out from the cache system 103 and then output to outside.

Figure 6:
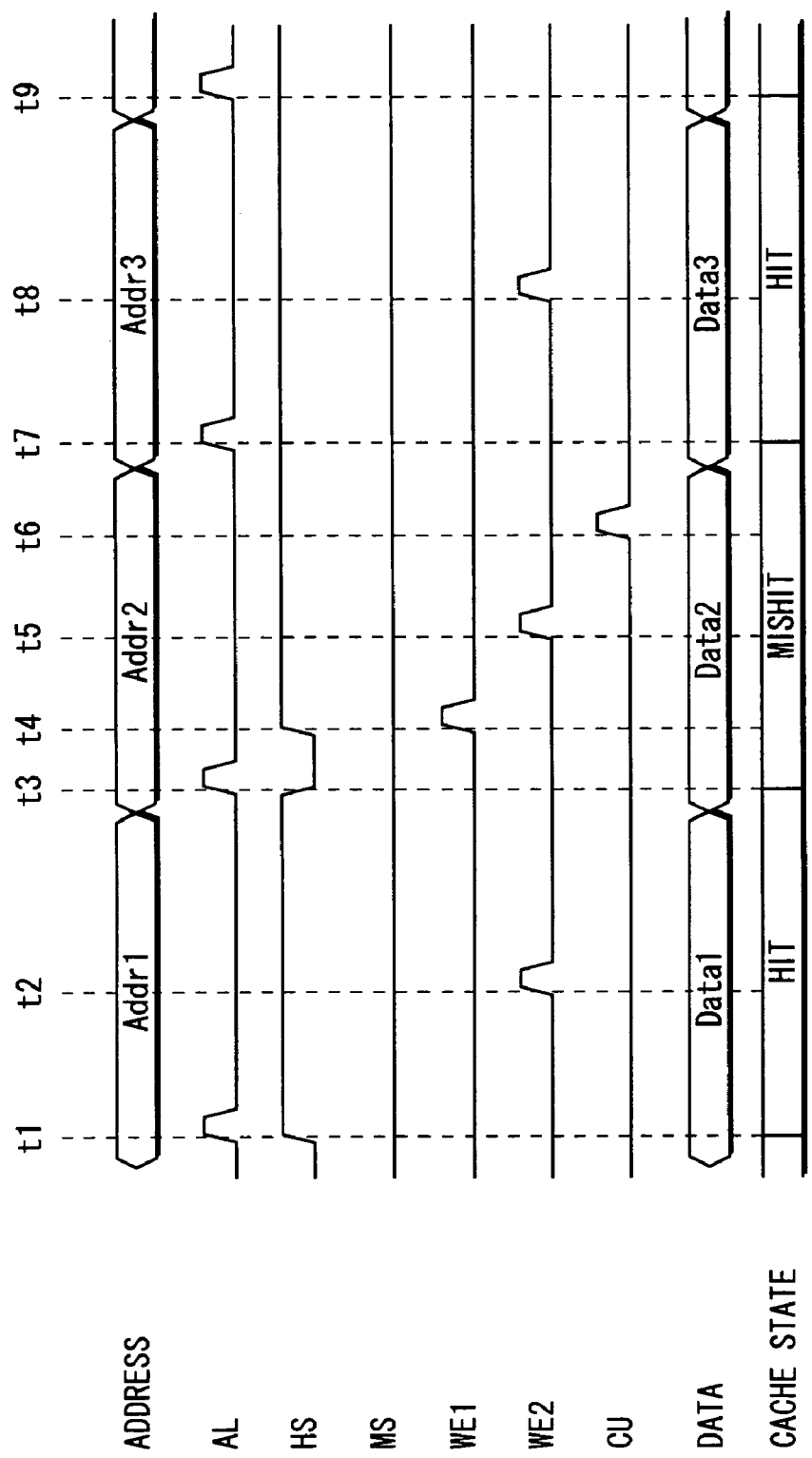
FIG. 6 is a timing chart of the operation performed after the cache system in Embodiment 1 receives a rewrite request.

FIG. 6 is a timing chart of the operation performed after the cache system in Embodiment 1 receives a rewrite request.

Upon receiving a rewrite request, the controller 104 outputs a control signal indicating the rewrite request to the control bus 107. The cache system 103 and the ferroelectric memory 102 receive the control signal, and start the rewriting operation. The controller 104 further outputs the address data specified by the rewrite request to the address bus 105. FIG. 6 shows a sample case in which Addr1, Addr2, and Addr3 are received in sequence as the address data specified by the rewrite request. It is supposed here that data Data1 and Data3, which respectively correspond to address data Addr1 and Addr3, have been copied in advance into the cache system 103, and that data Data2 corresponding to address data Addr2 has not been copied into the cache system 103.

<Time t1>

At time t1, the latch signal AL rises, and the register 11 acquires address data Addr1 from the address bus 105 and stores the acquired address data therein.

At this point in time, each block in the CAM 10 compares the address data stored in the register 12 with address data Addr1 stored in the register 11, and outputs a comparison result signal (Sc1, Sc2, . . . Scn). At this stage, only a comparison result signal output from a block that stores address data Addr1 represents "1", and the comparison result signals output from the remaining blocks represent "0".

At this stage, the hit signal HS changes to "1" since a comparison result signal has come to represent "1".

<Time t2>

At time t2, the storage control unit 51 sets the write enable signal WE2 to "1". The address decoder 20 identifies a block from which a comparison result signal representing "1" is output, and specifies a unit storage area in the SRAM 30 that corresponds to the identified block. The SRAM 30 acquires data Data1 from the data bus 106, and stores it in the specified unit storage area.

It is supposed here that at this stage, the ferroelectric memory 102 also stores data Data1 specified by the rewrite request into a unit storage area corresponding to address data Addr1.

<Time t3>

At time t3, the latch signal AL rises, and the register 11 of the CAM 10 acquires address data Addr2 from the address bus 105 and stores the acquired address data therein.

At this point in time, each block in the CAM 10 compares the address data stored in the register 12 with address data Addr2 stored in the register 11, and outputs a comparison result signal (Sc1, Sc2, . . . Scn). At this stage, there is no block that stores address data Addr2. As a result, all the output comparison result signals represent "0".

At this stage, the hit signal HS changes to "0" as all comparison result signals have come to represent "0".

<Time t4>

At time t4, the storage control unit 51 sets the write enable signal WE1 to "1". This causes the register 12 of the selected block, whose selection is indicated by the selection signal, to acquire address data Addr2 stored in the register 11, and store the acquired address data Addr2 therein. The registers 12 of the not-selected blocks, which are not indicated by the selection signal, do not acquire address data Addr2 stored in the registers 11 even if the write enable signal WE1 changes to "1".

When address data Addr2 is stored in the register 12 of any block, the comparison result signal output from the block represents "1" since address data Addr2 stored in the register 11 matches address data Addr2 stored in the register 12.

The address decoder 20 identifies a block from which a comparison result signal representing "1" is output, and specifies a unit storage area in the SRAM 30 that corresponds to the identified block.

Here, the hit signal HS changes to "1" as a comparison result signal has come to represent "1".

<Time t5>

At time t5, the storage control unit 51 sets the write enable signal WE2 to "1". In response to this, the SRAM 30 acquires data Data2 from the data bus 106, and stores the acquired data Data2 into a selected unit storage area.

It is supposed here that at this stage, the ferroelectric memory 102 also stores data Data2 into a unit storage area corresponding to address data Addr2.

<Time t6>

At time t6, the counter control unit 52 raises the count-up signal CU. In response to this, the counter 41 increments the count value by "1". The block to be selected next is determined by this operation.

<Time t7>

At time t7, the latch signal AL rises, and the register 11 acquires address data Addr3 from the address bus 105 and stores the acquired address data therein.

At this point in time, each block in the CAM 10 compares the address data stored in the register 12 with address data Addr3 stored in the register 11, and outputs a comparison result signal (Sc1, Sc2, . . . Scn). At this stage, only a comparison result signal output from a block that stores address data Addr3 represents "1", and the comparison result signals output from the remaining blocks represent "0".

At this stage, the hit signal HS changes to "1" since a comparison result signal has come to represent "1".

<Time t8>

At time t8, the storage control unit 51 sets the write enable signal WE2 to "1". The address decoder 20 identifies a block from which a comparison result signal representing "1" is output, and specifies a unit storage area in the SRAM 30 that corresponds to the identified block. The SRAM 30 acquires data Data3 from the data bus 106, and stores it in the specified unit storage area.

It is supposed here that at this stage, the ferroelectric memory 102 also stores data Data3 specified by the rewrite request into a unit storage area corresponding to address data Addr3.

Embodiment 2

<Construction>

Figure 7:
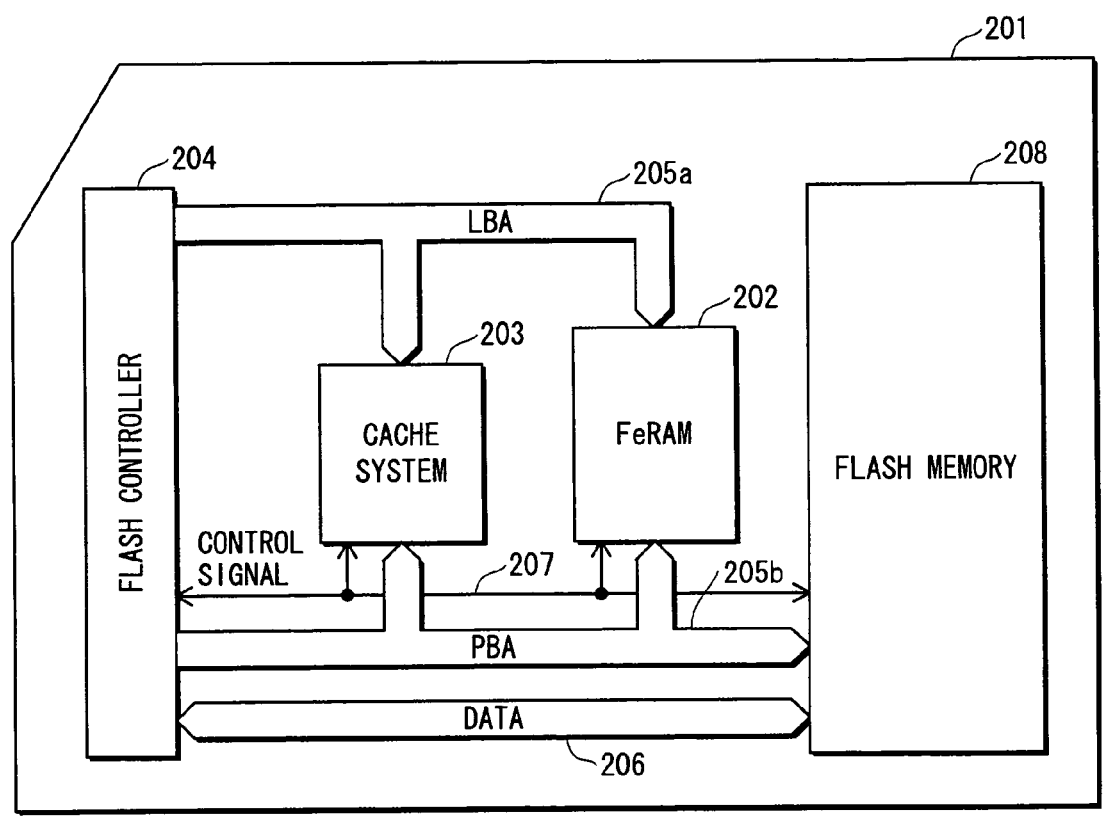
FIG. 7 shows an outline construction of a semiconductor storage apparatus in Embodiment 2.

FIG. 7 shows an outline construction of a semiconductor storage apparatus in Embodiment 2.

A semiconductor storage apparatus 201 includes a ferroelectric memory 202, a cache system 203, a flash controller 204, address buses 205a and 205b, a data bus 206, a control bus 207, and a flash memory 208.

The semiconductor storage apparatus in Embodiment 2 uses the flash memory 208 as a storage medium for storing data, and uses the ferroelectric memory 202 as a storage medium for storing an address conversion table. The address conversion table shows correspondence between physical addresses and logical addresses of the flash memory 208.

In general, in the flash memory, data is rewritten in units of data blocks. When all data in a data block is rewritten, it simply requires that the data block is overwritten. However, when data in a data block is partially rewritten, the data is transferred from the block to another block, and the data is partially rewritten. Accordingly, in the flash memory, a data transfer occurs with relatively high frequency. And each time such a data transfer occurs, the address conversion table needs to be updated. In Embodiment 2, the address conversion table is stored in the ferroelectric memory 202. This makes it possible to greatly reduce the time required to update the address conversion table since the rewriting speed of the ferroelectric memory 202 is one thousand times to one hundred thousand times faster than the rewriting speed of the flash memory 208.

The ferroelectric memory 202 includes a plurality of unit storage areas in each of which a physical address and a logical address, which correspond to each other, are stored. Upon receiving, via the control bus 207, a control signal that represents a read request, the ferroelectric memory 202 outputs, via the address bus 205b, a physical address that corresponds to a logical address received via the logical address bus 205a.

The cache system 203 includes a plurality of unit storage areas in which a copy of the data stored in the ferroelectric memory 202 is stored. In general, the number of the unit storage areas included in the cache system 203 is smaller than the number of the unit storage areas included in the ferroelectric memory 202.

The flash controller 204 causes the ferroelectric memory 202 and the cache system 203 to perform the reading and rewriting of data.

The operations of the cache system 203 and the flash controller 204 will be described later.

Figure 8:
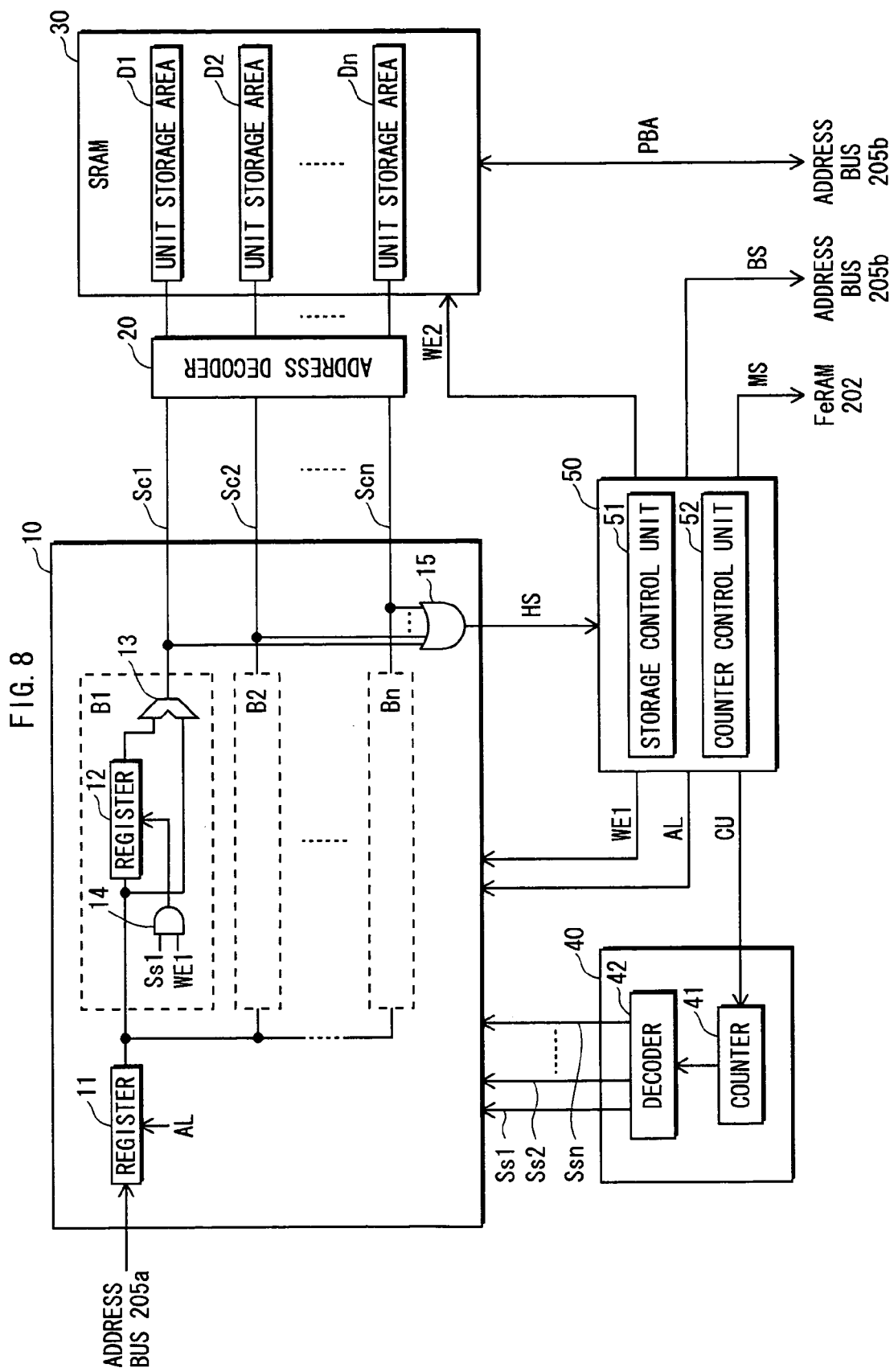
FIG. 8 shows the construction of the cache system 203 in Embodiment 2.

FIG. 8 shows the construction of the cache system 203 in Embodiment 2.

In Embodiment 2, each block in the CAM 10 stores a logical address LBA, and each unit storage area in the SRAM 30 stores a physical address PBA of the flash memory. The other constructions of the cache system 203 are the same as those of the cache system 103 in Embodiment 1, and the description thereof is omitted.

<Operation>

Figure 9:
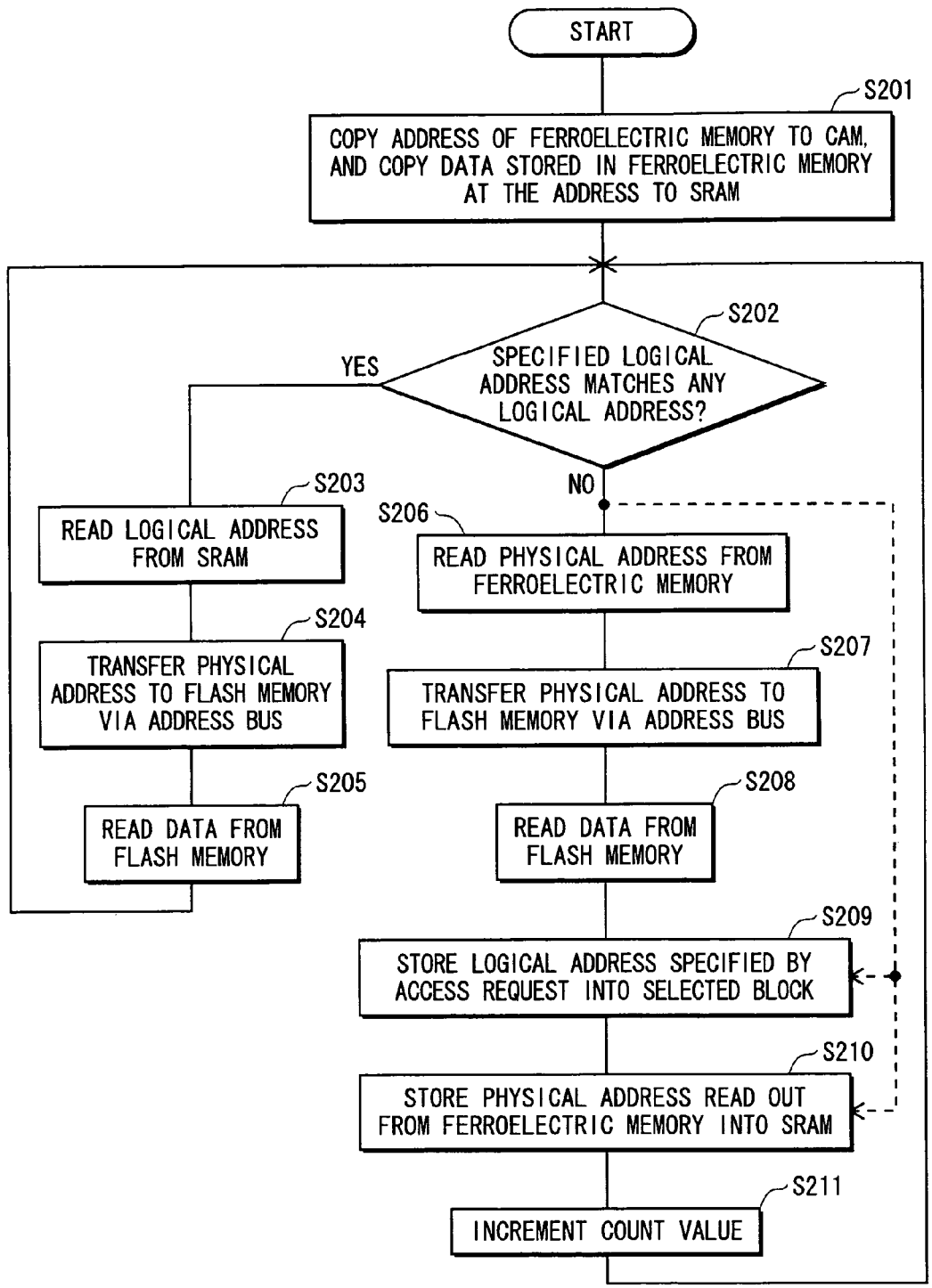
FIG. 9 is a flowchart showing the operational procedure of the semiconductor storage apparatus in Embodiment 2.

FIG. 9 is a flowchart showing the operational procedure of the semiconductor storage apparatus in Embodiment 2.

The semiconductor storage apparatus 201, when it is powered on, copies a predetermined part of logical and physical addresses stored in the ferroelectric memory 202 into the cache system 203. To accomplish this, the semiconductor storage apparatus 201 copies predetermined one or more logical addresses of the ferroelectric memory 202 into one or more blocks in the CAM 10, and copies predetermined one or more physical addresses into one or more unit storage areas in the SRAM 30 (step S201).

Upon receiving a request to access the flash memory 208, the semiconductor storage apparatus 201 judges whether or not the logical address specified by the access request matches any of the logical addresses stored in the blocks in the CAM 10 (step S202).

If it is judged positively (YES in step S202), the semiconductor storage apparatus 201 reads out a physical address from a unit storage area in the SRAM 30 that corresponds to the block storing an address that matched the address specified by the access request (step S203). The semiconductor storage apparatus 201 transfers the physical address read out in step S203, to the flash memory 208 via the physical address bus 205b (step S204), and reads out data from a unit storage area in the flash memory 208 at this physical address (step S205).

If it is judged negatively (NO in step S202), the semiconductor storage apparatus 201 reads out a physical address, which corresponds to the logical address, from the ferroelectric memory 202 (step S206). The semiconductor storage apparatus 201 transfers the physical address read out in step S206, to the flash memory 208 via the physical address bus 205b (step S207), and reads out data from a unit storage area in the flash memory 208 at this physical address (step S208).

When it is judged in step S202 that the logical address specified by the access request does not match any of the logical addresses stored in the blocks in the CAM 10, the semiconductor storage apparatus 201 further copies the logical address specified by the access request into a selected block whose selection is indicated by a selection signal (step S209), and copies the physical address read out in step S206 into a unit storage area in the SRAM 30 that corresponds to the selected block (step S210).

The semiconductor storage apparatus 201 then increments the count value of the counter 41 (step S211). With this operation, a block different from one having been selected so far is selected. As the semiconductor storage apparatus 201 repeats the above-described operations, the n number of blocks stored in the CAM 10 are selected one by one.

It should be noted here that steps S206, S209, and S210 may be executed in sequence, or may be executed all at once.

The following describes the operation of the semiconductor storage apparatus 201 shown in FIG. 9 in detail with reference to a timing chart.

Figure 10:
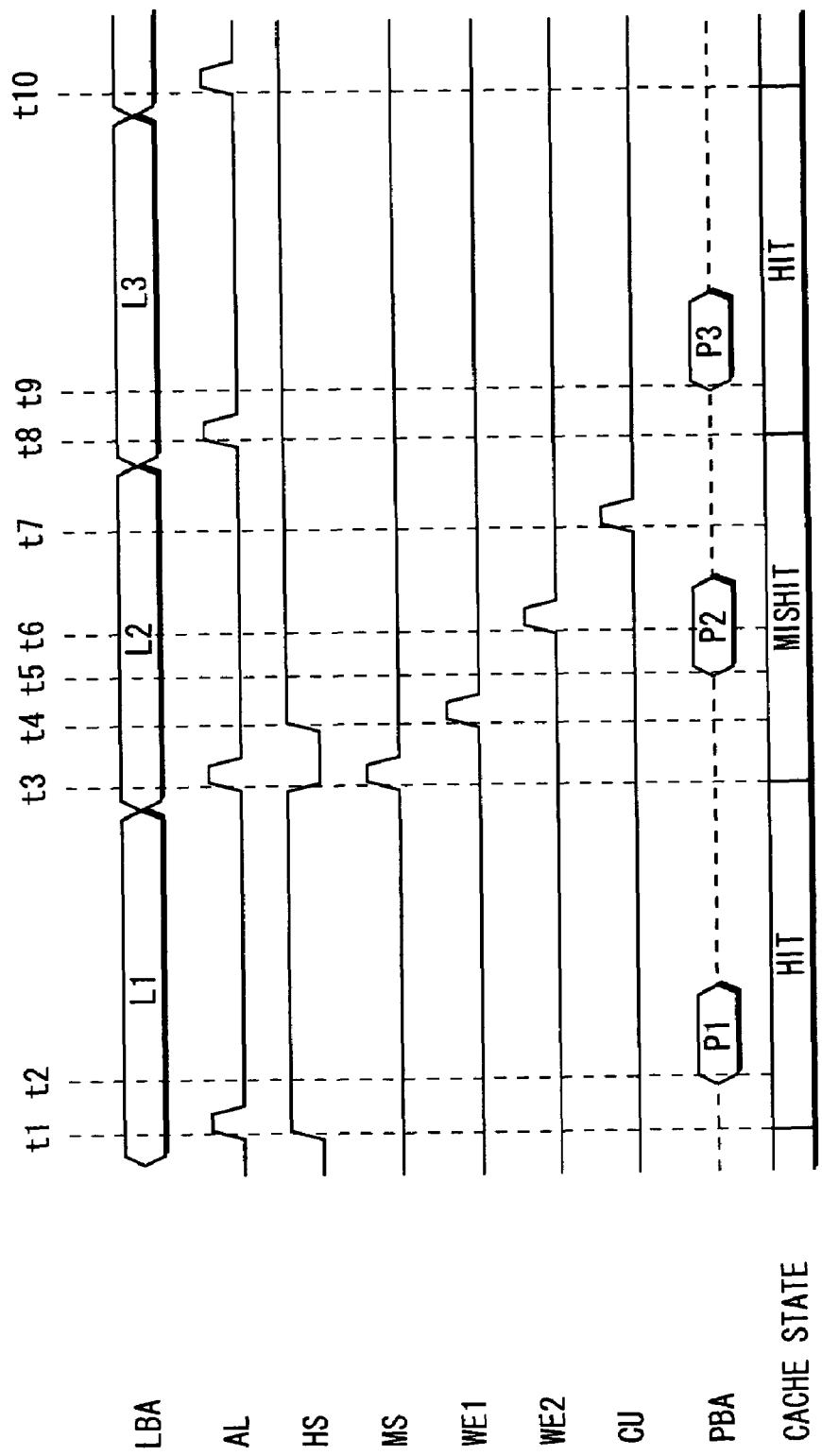
FIG. 10 is a timing chart of the operation performed after the cache system in Embodiment 2 receives a read request.

FIG. 10 is a timing chart of the operation performed after the cache system in Embodiment 2 receives a read request.

The flash controller 204 outputs a control signal indicating the read request to the control bus 207. The cache system 203 and the ferroelectric memory 202 receive the control signal, and start the reading operation. The flash controller 204 further outputs a logical address specified by the read request to the logical address bus 205a. FIG. 10 shows a sample case in which L1, L2, and L3 are received in sequence as the logical addresses specified by the read request. It is supposed here that physical addresses P1 and P3, which respectively correspond to logical addresses L1 and L3, have been copied in advance into the cache system 203, and that physical address P2 corresponding to logical address L2 has not been copied into the cache system 203.

<Time t1>

At time t1, the latch signal AL rises, and the register 11 acquires logical address L1 from the logical address bus 205a and stores the acquired logical address therein.

At this point in time, each block in the CAM 10 compares the logical address stored in the register 12 with logical address L1 stored in the register 11, and outputs a comparison result signal (Sc1, Sc2, . . . Scn). At this stage, only a comparison result signal output from a block that stores logical address L1 represents "1", and the comparison result signals output from the remaining blocks represent "0".

At this stage, the hit signal HS changes to "1" since a comparison result signal has come to represent "1".

<Time t2>

At time t2, the address decoder 20 identifies a block from which a comparison result signal representing "1" is output, and specifies a unit storage area in the SRAM 30 that corresponds to the identified block. The SRAM 30, recognizing that the write enable signal WE2 represents "0", outputs physical address P1, which is stored in the specified unit storage area, to the physical address bus 205b. The flash memory 208 outputs data stored in a unit storage area specified by the physical address P1, to the data bus 206. The flash controller 204 acquires data from the data bus 206, and outputs the acquired data to outside.

As explained above, physical address P1 is not read out from the ferroelectric memory 202, but is read out from the cache system 203.

<Time t3>

At time t3, the latch signal AL rises, and the register 11 of the CAM 10 acquires logical address L2 from the logical address bus 205a and stores the acquired logical address therein.

At this point in time, each block in the CAM 10 compares the logical address stored in the register 12 with logical address L2 stored in the register 11, and outputs a comparison result signal (Sc1, Sc2, . . . Scn). At this stage, there is no block that stores logical address L2. As a result, all the output comparison result signals represent "0".

At this stage, the hit signal HS changes to "0" as all comparison result signals have come to represent "0".

Recognizing that the hit signal HS has changed to "0", the storage control unit 51 sets the mishit occurrence signal MS to "1". Upon receiving the mishit occurrence signal MS that has changed to "1", the ferroelectric memory 202 is notified that a cache mishit has occurred.

<Time t4>

At time t4, the storage control unit 51 sets the write enable signal WE1 to "1". This causes the register 12 of the selected block, whose selection is indicated by the selection signal, to acquire logical address L2 stored in the register 11, and store the acquired logical address L2 therein. The registers 12 of the not-selected blocks, which are not indicated by the selection signal, do not acquire logical addresses L2 stored in the registers 11 even if the write enable signal WE1 changes to "1".

When logical address L2 is stored in the register 12 of any block, the comparison result signal output from the block represents "1" since logical address L2 stored in the register 11 matches logical address L2 stored in the register 12.

The address decoder 20 identifies a block from which a comparison result signal representing "1" is output, and specifies a unit storage area in the SRAM 30 that corresponds to the identified block.

Here, the hit signal HS changes to "1" as a comparison result signal has come to represent "1".

<Time t5>

At time t5, the ferroelectric memory 202 outputs, to the physical address bus 205b, physical address P2 stored in a unit storage area specified by logical address L2, in response to the change of the mishit occurrence signal MS into "1" at time t3. The flash memory 208 outputs data stored in a unit storage area specified by the physical address P2, to the data bus 206. The flash controller 204 acquires the data from the data bus 206, and outputs the acquired data to outside.

<Time t6>

At time t6, the storage control unit 51 sets the write enable signal WE2 to "1". In response to this, the SRAM 30 acquires physical address P2 from the physical address bus 205b, and stores the acquired physical address P2 into a selected unit storage area.

This enables physical address P2 to be copied into the cache system 203 when a cache mishit occurs after a read request is received.

<Time t7>

At time t7, the counter control unit 52 raises the count-up signal CU. In response to this, the counter 41 increments the count value by "1". The block to be selected next is determined by this operation.

<Time t8>

At time t8, the latch signal AL rises, and the register 11 acquires logical address L3 from the address bus 105 and stores the acquired logical address L3 therein.

At this point in time, each block in the CAM 10 compares the logical address stored in the register 12 with logical address L3 stored in the register 11, and outputs a comparison result signal (Sc1, Sc2, . . . Scn). At this stage, only a comparison result signal output from a block that stores logical address L3 represents "1", and the comparison result signals output from the remaining blocks represent "0".

Here, the hit signal HS changes to "1" as a comparison result signal has come to represent "1".

<Time t9>

At time t9, the address decoder 20 identifies a block from which a comparison result signal representing "1" is output, and specifies a unit storage area in the SRAM 30 that corresponds to the identified block. The SRAM 30, recognizing that the write enable signal WE2 represents "0", outputs physical address P3, which is stored in the specified unit storage area, to the physical address bus 205b. The flash memory 208 outputs data stored in a unit storage area specified by the physical address P3, to the data bus 206. The flash controller 204 acquires the data from the data bus 206, and outputs the acquired data to outside.

As explained above, physical address P3 is not read out from the ferroelectric memory 202, but is read out from the cache system 203.

Figure 11:
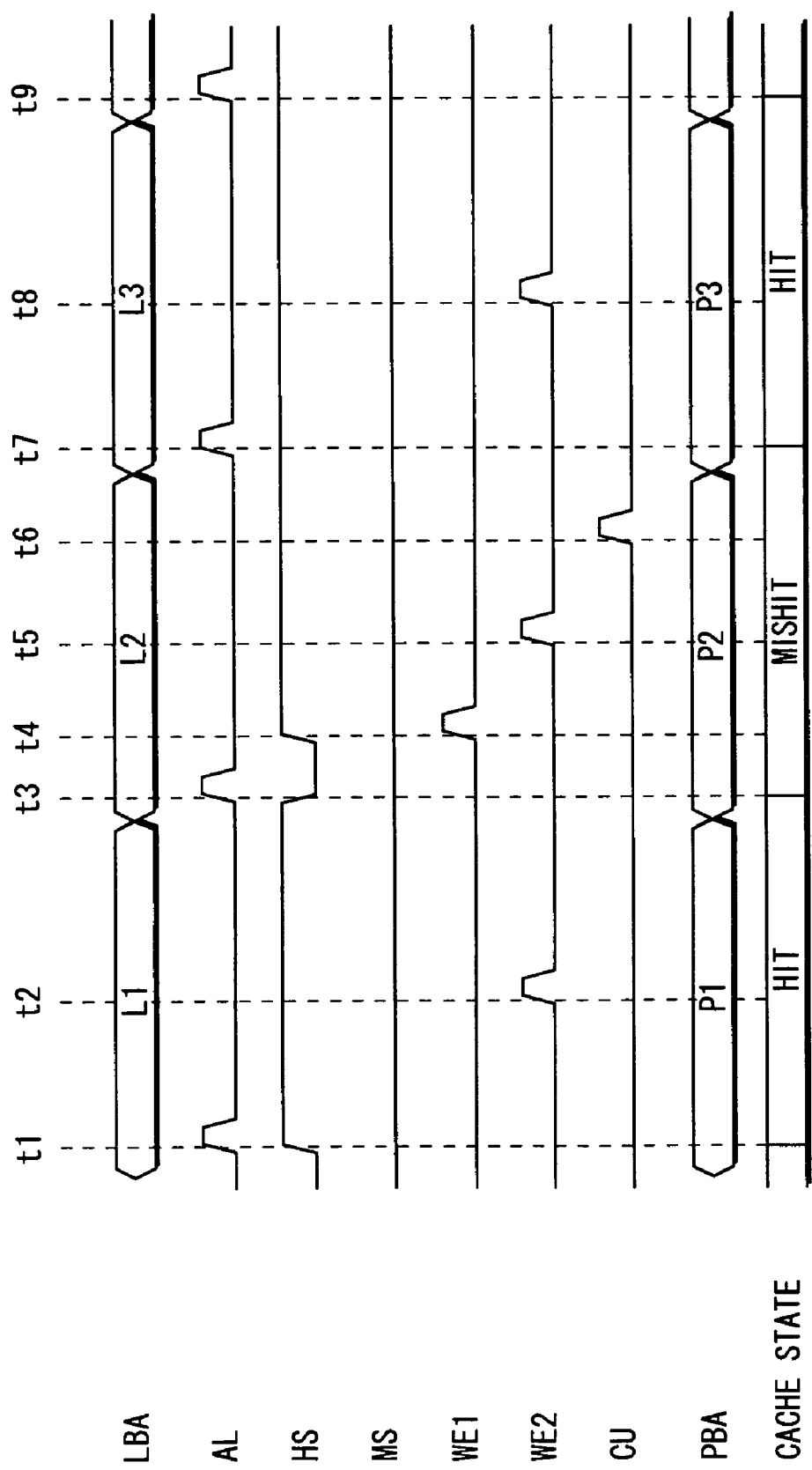
FIG. 11 is a timing chart of the operation performed after the cache system in Embodiment 2 receives a rewrite request.

FIG. 11 is a timing chart of the operation performed after the cache system in Embodiment 2 receives a rewrite request.

Upon receiving a rewrite request, the flash controller 204 outputs a control signal indicating the rewrite request to the control bus 207. The cache system 203 and the ferroelectric memory 202 receive the control signal, and start the rewriting operation. The flash controller 204 further outputs a logical address specified by the rewrite request to the logical address bus 205a. FIG. 11 shows a sample case in which L1, L2, and L3 are received in sequence, as the logical addresses specified by the rewrite request. It is supposed here that physical addresses P1 and P3, which respectively correspond to logical addresses L1 and L3, have been copied in advance into the cache system 203, and that physical address P2 corresponding to logical address L2 has not been copied into the cache system 203.

<Time t1>

At time t1, the latch signal AL rises, and the register 11 acquires logical address L1 from the logical address bus 205a and stores the acquired logical address L1 therein.

At this point in time, each block in the CAM 10 compares the logical address stored in the register 12 with logical address L1 stored in the register 11, and outputs a comparison result signal (Sc1, Sc2, . . . Scn). At this stage, only a comparison result signal output from a block that stores logical address L1 represents "1", and the comparison result signals output from the remaining blocks represent "0".

At this stage, the hit signal HS changes to "1" since a comparison result signal has come to represent "1".

<Time t2>

At time t2, the storage control unit 51 sets the write enable signal WE2 to "1". The address decoder 20 identifies a block from which a comparison result signal representing "1" is output, and specifies a unit storage area in the SRAM 30 that corresponds to the identified block. The SRAM 30 acquires physical address P1 from the physical address bus 205b, and stores the acquired physical address P1 in the specified unit storage area.

It is supposed here that at this stage, the ferroelectric memory 202 also stores physical address P1 specified by the rewrite request into a unit storage area corresponding to logical address L1.

<Time t3>

At time t3, the latch signal AL rises, and the register 11 of the CAM 10 acquires logical address L2 from the logical address bus 205a.

At this point in time, each block in the CAM 10 compares the logical address stored in the register 12 with logical address L2 stored in the register 11, and outputs a comparison result signal (Sc1, Sc2, . . . Scn). At this stage, there is no block that stores logical address L2. As a result, all the output comparison result signals represent "0".

At this stage, the hit signal HS changes to "0" as all comparison result signals have come to represent "0".

<Time t4>

At time t4, the storage control unit 51 sets the write enable signal WE1 to "1". This causes the register 12 of the selected block, whose selection is indicated by the selection signal, to acquire logical address L2 stored in the register 11, and store the acquired logical address L2 therein. The registers 12 of the not-selected blocks, which are not indicated by the selection signal, do not acquire logical address L2 stored in the registers 11 even if the write enable signal WE1 changes to "1".

When logical address L2 is stored in the register 12 of any block, the comparison result signal output from the block represents "1" since logical address L2 stored in the register 11 matches logical address L2 stored in the register 12.

The address decoder 20 identifies a block from which a comparison result signal representing "1" is output, and specifies a unit storage area in the SRAM 30 that corresponds to the identified block.

Here, the hit signal HS changes to "1" as a comparison result signal has come to represent "1".

<Time t5>

At time t5, the storage control unit 51 sets the write enable signal WE2 to "1". In response to this, the SRAM 30 acquires physical address P2 from the physical address bus 205b, and stores the acquired physical address P2 into a selected unit storage area.

It is supposed here that at this stage, the ferroelectric memory 202 also stores physical address P2 into a unit storage area corresponding to logical address L2.

<Time t6>

At time t6, the counter control unit 52 raises the count-up signal CU. In response to this, the counter 41 increments the count value by "1". The block to be selected next is determined by this operation.

<Time t7>

At time t7, the latch signal AL rises, and the register 11 acquires logical address L3 from the logical address bus 205a and stores the acquired logical address L3 therein.

At this point in time, each block in the CAM 10 compares the logical address stored in the register 12 with logical address L3 stored in the register 11, and outputs a comparison result signal (Sc1, Sc2, . . . Scn). At this stage., only a comparison result signal output from a block that stores logical address L3 represents "1", and the comparison result signals output from the remaining blocks represent "0".

At this stage, the hit signal HS changes to "1" since a comparison result signal has come to represent "1".

<Time t8>

At time t8, the storage control unit 51 sets the write enable signal WE2 to "1". The address decoder 20 identifies a block from which a comparison result signal representing "1" is output, and specifies a unit storage area in the SRAM 30 that corresponds to the identified block. The SRAM 30 acquires physical address P3 from the physical address bus 205b, and stores the acquired physical address P3 in the specified unit storage area.

It is supposed here that at this stage, the ferroelectric memory 202 also stores physical address P3 into a unit storage area corresponding to logical address L3.

Figure 12:
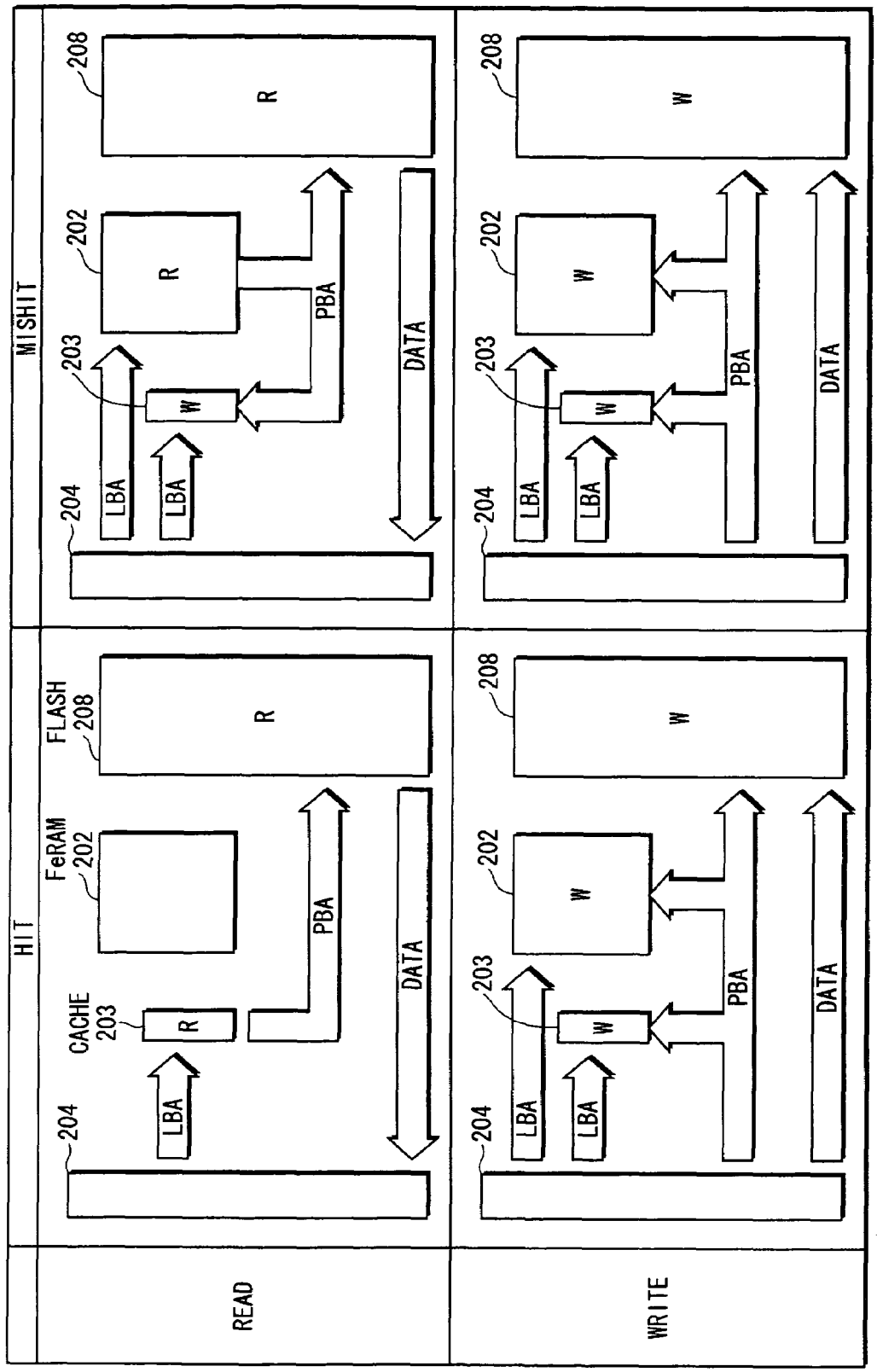
FIG. 12 illustrates the address conversion operation in Embodiment 2.

FIG. 12 illustrates the address conversion operation in Embodiment 2.

When a read request to read physical address PBA is received, and a cache hit is detected, the physical address PBA is output from the cache system 203.

When a read request to read physical address PBA is received, and a cache mishit is detected, the physical address PBA is output from the ferroelectric memory 202. And the physical address PBA output from the ferroelectric memory 202 is stored in the cache system 203.

When a rewrite request to rewrite physical address PBA is received, and a cache hit is detected, the physical address PBA is stored in both the cache system 203 and the ferroelectric memory 202.

When a rewrite request to rewrite physical address PBA is received, and a cache mishit is detected, the physical address PBA is stored in both the cache system 203 and the ferroelectric memory 202.

Embodiment 3

<Construction>

Figure 13:
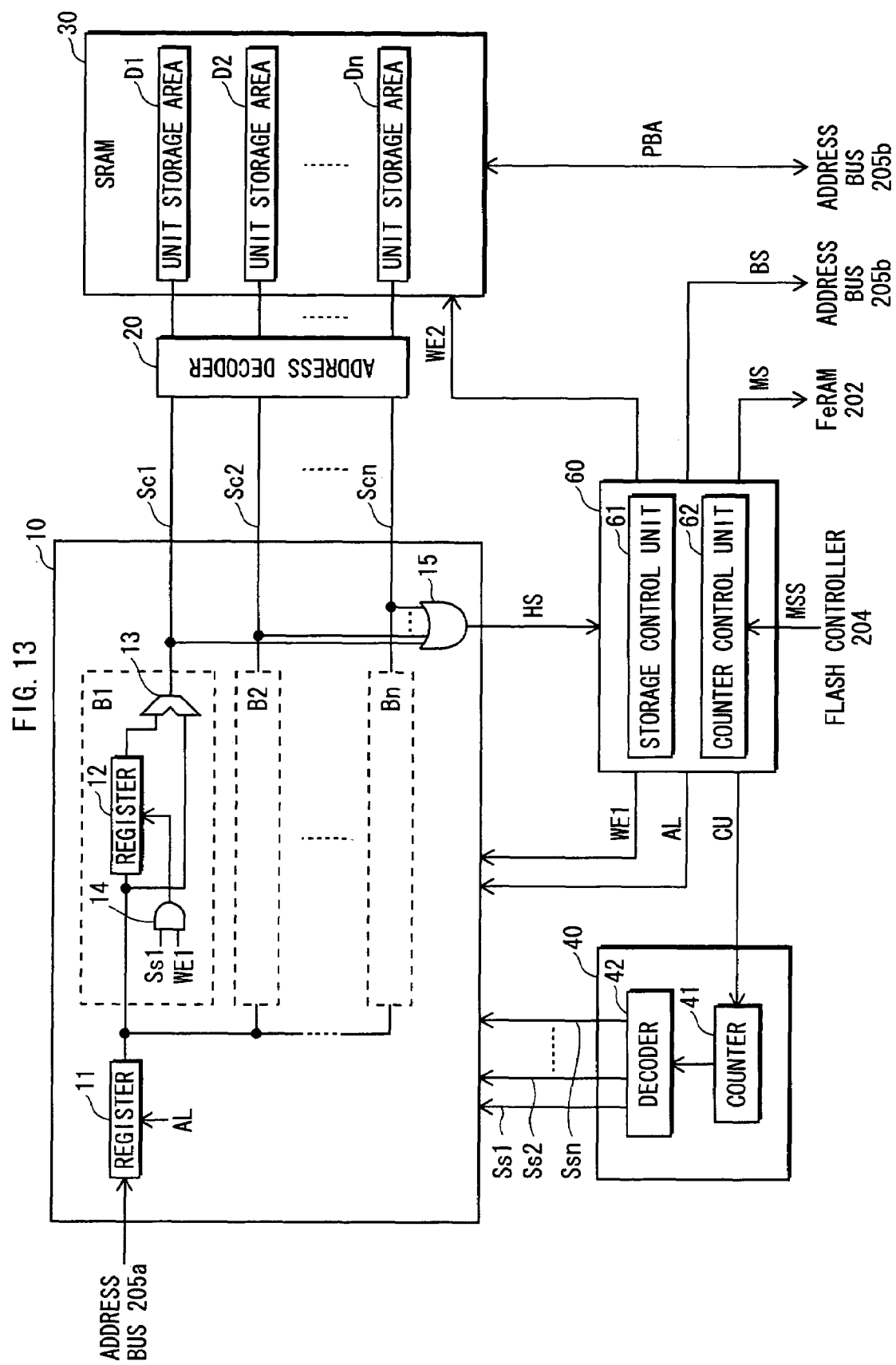
FIG. 13 shows the construction of the cache system 203 in Embodiment 3.

FIG. 13 shows the construction of the cache system 203 in Embodiment 3.

In Embodiment 3, the flash memory 208 is used as a storage medium in a semiconductor storage apparatus, as in Embodiment 2. Embodiment 3 differs from Embodiment 2 only by a control unit 60. The other constructions are the same as those of Embodiment 2, and the description thereof is omitted.

The control unit 60 receives a mode switch signal MSS from the flash controller 204. The mode switch signal MSS is used to indicate a normal mode (non-power-saving mode) or in a power-saving mode in which an operation is performed when a request to rewrite the physical address PBA is received and a cache mishit is detected. In the normal mode, both the cache system 203 and the ferroelectric memory 202 store the physical address PBA, which is the same operation as in Embodiment 2. On the other hand, in the power-saving mode, the cache system 203 does not store the physical address PBA, and only the ferroelectric memory 202 does. In the power-saving mode, the cache system 203 is not operated. Accordingly, the power consumption is smaller in the power-saving mode than in the normal mode. The other constructions of the control unit 60 are the same as those in Embodiment 2.

<Operation>

Figure 14:
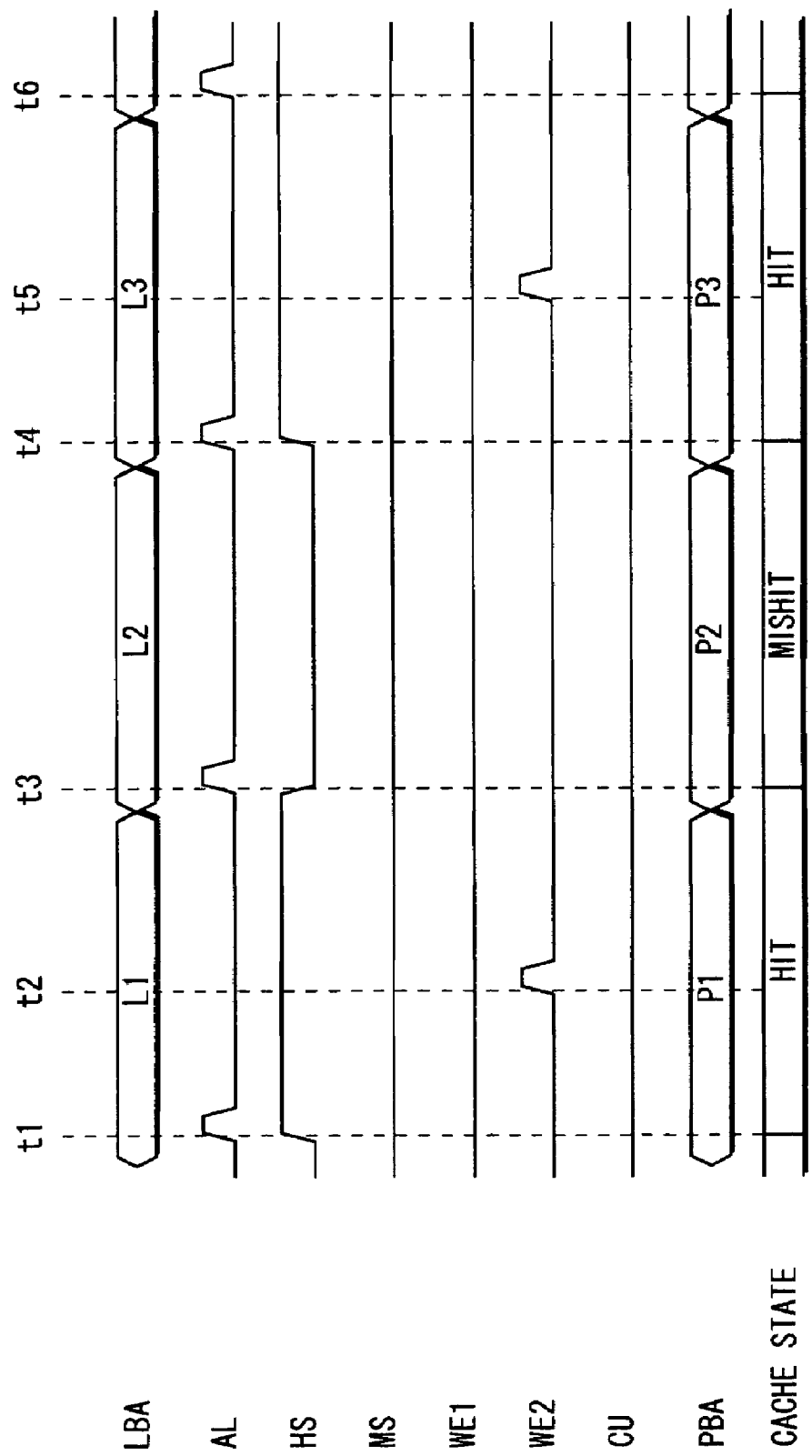
FIG. 14 is a timing chart of the operation performed after the semiconductor storage apparatus in Embodiment 3 receives a rewrite request.

FIG. 14 is a timing chart of the operation performed after the semiconductor storage apparatus in Embodiment 3 receives a rewrite request.

The operation performed when a read request is received is the same as that in Embodiment 2, and thus the description there of is omitted. Also, the operation performed in the normal mode when a rewrite request is received is the same as that in Embodiment 2. Accordingly, only the operation performed in the power-saving mode when a rewrite request to rewrite the physical address PBA is received will be described here.

Upon receiving a rewrite request, the flash controller 204 outputs a control signal indicating the rewrite request to the control bus 207. The cache system 203 and the ferroelectric memory 202 receive the control signal, and start the rewriting operation. The flash controller 204 further outputs a logical address specified by the rewrite request to the logical address bus 205a. FIG. 14 shows a sample case in which L1, L2, and L3 are received in sequence, as the logical addresses specified by the rewrite request. It is supposed here that physical addresses P1 and P3, which respectively correspond to logical addresses L1 and L3, have been copied in advance into the cache system 203, and that physical address P2 corresponding to logical address L2 has not been copied into the cache system 203.

<Time t1>

At time t1, the latch signal AL rises, and the register 11 acquires logical address L1 from the logical address bus 205a and stores the acquired logical address L1 therein.

At this point in time, each block in the CAM 10 compares the logical address stored in the register 12 with logical address L1 stored in the register 11, and outputs a comparison result signal (Sc1, Sc2, . . . Scn). At this stage, only a comparison result signal output from a block that stores logical address L1 represents "1", and the comparison result signals output from the remaining blocks represent "0".

At this stage, the hit signal HS changes to "1" since a comparison result signal has come to represent "1".

<Time t2>

At time t2, the storage control unit 61 sets the write enable signal WE2 to "1". The address decoder 20 identifies a block from which a comparison result signal representing "1" is output, and specifies a unit storage area in the SRAM 30 that corresponds to the identified block. The SRAM 30 acquires physical address P1 from the physical address bus 205b, and stores the acquired physical address P1 in the specified unit storage area.

It is supposed here that at this stage, the ferroelectric memory 202 also stores physical address P1 specified by the rewrite request into a unit storage area corresponding to logical address L1.

<Time t3>

At time t3, the latch signal AL rises, and the register 11 of the CAM 10 acquires logical address L2 from the logical address bus 205a.

At this point in time, each block in the CAM 10 compares the logical address stored in the register 12 with logical address L2 stored in the register 11, and outputs a comparison result signal (Sc1, Sc2, . . . Scn). At this stage, there is no block that stores logical address L2. As a result, all the output comparison result signals represent "0".

At this stage, the hit signal HS changes to "0" as all comparison result signals have come to represent "0".

In the power-saving mode, the storage control unit 61 does not change the mishit occurrence signal MS or the write enable signal WE1 or WE2 to "1" even if the hit signal HS changes to "0".

Also, in the power-saving mode, the counter control unit 62 does not change the count-up signal CU to "1" even if the hit signal HS changes to "0".

This causes the cache system 203 to stop operating.

It is supposed here that at this stage, the ferroelectric memory 202 stores physical address P1 into a unit storage area corresponding to logical address L1.

<Time t4>

At time t4, the latch signal AL rises, and the register 11 acquires logical address L3 from the logical address bus 205a and stores the acquired logical address L3 therein.

At this point in time, each block in the CAM 10 compares the logical address stored in the register 12 with logical address L3 stored in the register 11, and outputs a comparison result signal (Sc1, Sc2, . . . Scn). At this stage, only a comparison result signal output from a block that stores logical address L3 represents "1", and the comparison result signals output from the remaining blocks represent "0".

At this stage, the hit signal HS changes to "1" since a comparison result signal has come to represent "1".

<Time t5>

At time t5, the storage control unit 61 sets the write enable signal WE2 to "1". The address decoder 20 identifies a block from which a comparison result signal representing "1" is output, and specifies a unit storage area in the SRAM 30 that corresponds to the identified block. The SRAM 30 acquires physical address P3 from the physical address bus 205b, and stores the acquired physical address P3 in the specified unit storage area.

It is supposed here that at this stage, the ferroelectric memory 202 also stores physical address P3 into a unit storage area corresponding to logical address L3.

Figure 15:
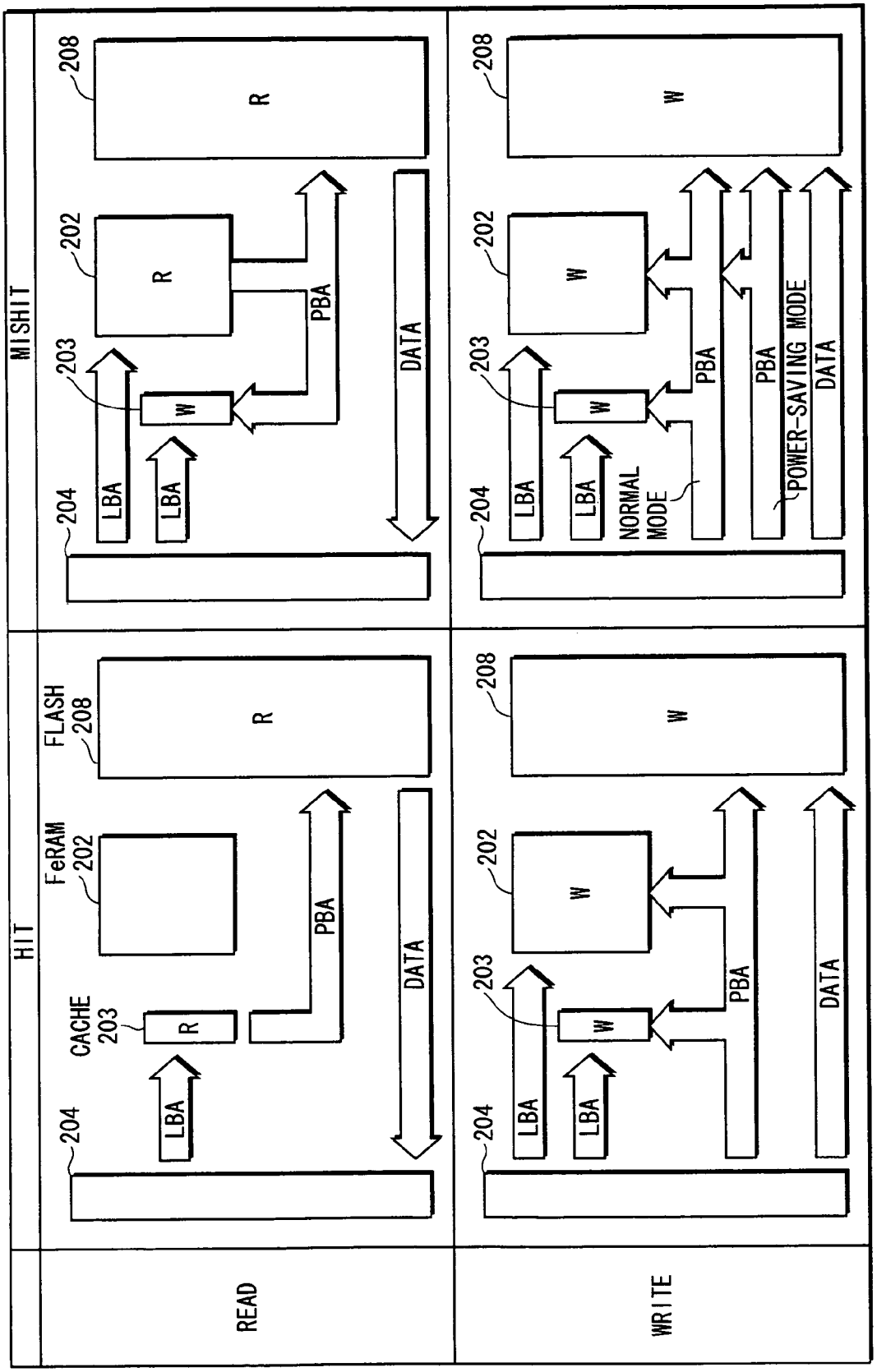
FIG. 15 illustrates the address conversion operation in Embodiment 3.

FIG. 15 illustrates the address conversion operation in Embodiment 3.

When a read request to read physical address PBA is received, and a cache hit is detected, the physical address PBA is output from the cache system 203.

When a read request to read physical address PBA is received, and a cache mishit is detected, the physical address PBA is output from the ferroelectric memory 202. And the physical address PBA output from the ferroelectric memory 202 is stored in the cache system 203.

When a rewrite request to rewrite physical address PBA is received, and a cache hit is detected, the physical address PBA is stored in both the cache system 203 and the ferroelectric memory 202.

When a rewrite request to rewrite physical address PBA is received, and a cache mishit is detected: in the normal mode, the physical address PBA is stored in both the cache system 203 and the ferroelectric memory 202; and in the power-saving mode, the physical address PBA is stored only in the ferroelectric memory 202.

Up to now, the semiconductor storage apparatus of the present invention has been described through embodiments thereof. However, the present invention is not limited to the embodiments, but may be modified in a variety of ways. The following describes some modifications.

(1) In the above embodiments, the counter increments the value. However, the counter may decrement the value.

(2) In the above embodiments, when a cache mishit occurs, data is stored in a block selected in accordance with the counter value, and then the counter increments the value. However, not limited to this, the counter may increment the value first, and then data may be stored in a block selected in accordance with the counter value.

Figure 16:
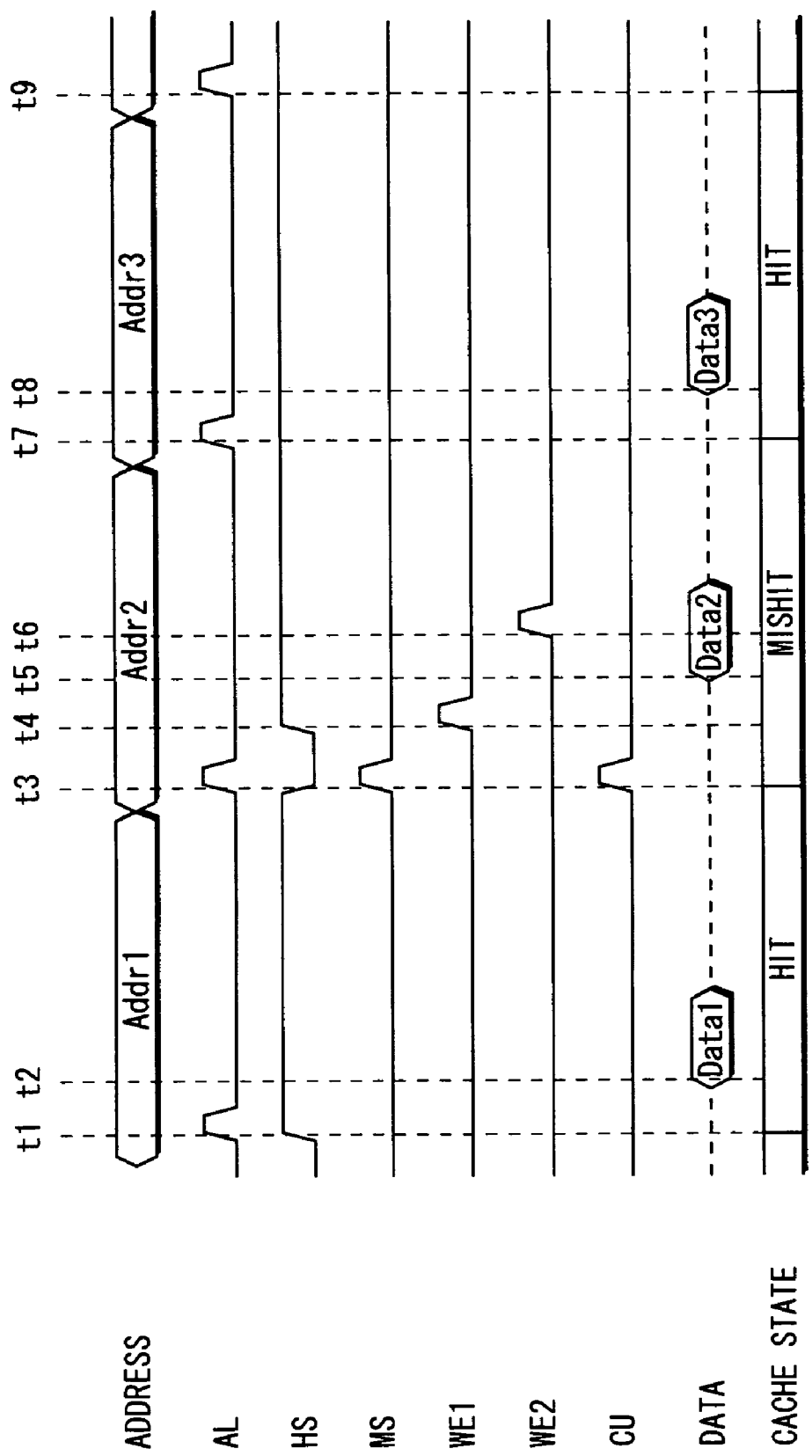
FIG. 16 is a timing chart of the operation performed after the semiconductor storage apparatus in the present modification receives a read request.

FIG. 16 is a timing chart of the operation performed after the semiconductor storage apparatus in the present modification receives a read request.

The counter control unit in the present modification changes the count-up signal CU to "1" immediately after the hit signal HS changes to "1". In response to this, at time t3, the count-up signal CU rises. This causes the counter to increment the count value by "1".

Then, at time t4, the storage control unit sets the write enable signal WE1 to "1". As a result of this, a block indicated by a selection signal representing "1", among the blocks (B1, B2, . . . Bn), stores address Addr2 stored in the register 11.

(3) In the above embodiments, SRAM is used as a cache memory. However, not limited to this, any memory, such as DRAM (Dynamic Random Access Memory), MRAM (Magnetic Random Access Memory), RRAM (Resistance Random Access Memory), or PRAM (Phase change Random Access Memory), may be used in so far as it has longer life based on the number of readings than the ferroelectric memory.

(4) In the above embodiments, the non-power-saving mode or the power-saving mode is selected according to an instruction from outside. However, not limited to this, the semiconductor storage apparatus 201 may select the mode on its own judgment. For example, when the power source of the semiconductor storage apparatus 201 is a battery, the power voltage decreases as the remaining battery level decreases. To cope with this, the semiconductor storage apparatus 201 may be provided with a power voltage monitor circuit such that when the power voltage is higher than a predetermined value, the non-power-saving mode is selected, and when the power voltage is not higher than the predetermined value, the power-saving mode is selected.

(5) In Embodiment 2, when a rewrite request is received, and a cache hit is detected, the data related to the rewrite request is stored in both the cache memory and the ferroelectric memory. However, not limited to this, for example, when a rewrite request is received and a cache hit is detected, the data related to the rewrite request may be stored only in the ferroelectric memory. With this construction, the power consumption is reduced since the cache memory is not operated. This construction is especially effective when there is little possibility that the data reading is performed immediately after the data writing is performed.

(6) Embodiment 3 is explained as a modification to Embodiment 2. However, not limited to this, Embodiment 3 may be combined with Embodiment 1 for application.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A semiconductor storage apparatus comprising:
a ferroelectric memory including a plurality of unit storage areas that store data therein;
a cache memory including a plurality of unit storage areas each of which stores a copy of data stored in a unit storage area of the ferroelectric memory, and which are less in number than the plurality of unit storage areas included in the ferroelectric memory;
a counter operable to indicate a count value that corresponds to one of the plurality of unit storage areas in the cache memory;
a judging unit operable to judge whether or not a block of data requested to be read out from a unit storage area of the ferroelectric memory is stored in a unit storage area of the cache memory, as a copy of the block of data;
a storage control unit operable to, if a result of the judgment by the judging unit is negative, perform a control to read out the requested block of data from the ferroelectric memory and store a copy of the read-out block of data into a unit storage area in the cache memory that corresponds to the count value indicated by the counter; and
a counter control unit operable to cause the counter to update the count value each time a result of the judgment by the judging unit is negative.

2. The semiconductor storage apparatus of claim 1, wherein
the cache memory has a longer life than the ferroelectric memory on a premise that a life of a memory is determined in accordance with a number of times data is read from the memory.

3. The semiconductor storage apparatus of claim 1, wherein
the counter is an asynchronous counter.

4. A semiconductor storage apparatus comprising:
a ferroelectric memory including a plurality of unit storage areas that store data therein;
a cache memory including a plurality of unit storage areas each of which stores a copy of data stored in a unit storage area of the ferroelectric memory, and which are less in number than the plurality of unit storage areas included in the ferroelectric memory;
a storage control unit operable to perform a control to store a block of data, which is requested by a rewrite request to be written to the ferroelectric memory, into a unit storage area of the ferroelectric memory, and perform a control to store a copy of the requested block of data into a unit storage area of the cache memory; and
a judging unit operable to judge whether or not a block of data be replaced with the requested block of data is stored in a unit storage area of the cache memory as a copy thereof, wherein
if a result of the judgment by the judging unit is negative, the storage control unit does not perform a control to store a copy of the request block of data into a unit storage area of the cache memory.

5. A semiconductor storage apparatus comprising:
a ferroelectric memory including a plurality of unit storage areas that store data therein;
a cache memory including a plurality of unit storage areas each of which stores a copy of data stored in a unit storage area of the ferroelectric memory, and which are less in number than the plurality of unit storage areas included in the ferroelectric memory;
a storage control unit operable to perform a control to store a block of data, which is requested by a rewrite request to be written to the ferroelectric memory, into a unit storage area of the ferroelectric memory, and perform a control to store a copy of the requested block of data into a unit storage area of the cache memory;
a receiving unit operable to receive a specification of either a power-saving mode or a non-power-saving mode; and
a judging unit operable to judge whether or not a block of data to be replaced with the requested block of data is stored in a unit storage area of the cache memory as a copy thereof, wherein
if a result of the judgment by the judging unit is negative and the receiving unit receives specification of the power-saving mode, the storage control unit does not perform a control to store a copy of the requested block of data into a unit storage area of the cache memory.

6. A semiconductor storage apparatus comprising:
a ferroelectric memory including a plurality of unit storage areas that store data therein;
a cache memory including a plurality of unit storage areas each of which stores a copy of data stored in a unit storage area of the ferroelectric memory, and which are less in number than the plurality of unit storage areas included in the ferroelectric memory;
a storage control unit operable to perform a control to store a block of data, which is requested by a rewrite request to be written to the ferroelectric memory, into a unit storage area of the ferroelectric memory, and perform a control to store a copy of the requested block of data into a unit storage area of the cache memory;
a counter operable to indicate a count value that corresponds to one of the plurality of unit storage areas in the cache memory;
a judging unit operable to judge whether or not a block of data to be replaced with the requested block of data is stored in a unit storage area of the cache memory as a copy thereof; and a counter control unit operable to cause the counter to update the count value each time a result of the judgment by the judging unit is negative, wherein if a result of the judgment by the judging unit is positive, the storage control unit performs a control to replace, in the cache memory, the copy of the block of data to be replaced, with a copy of the requested block of data, and performs a control to replace the block of data stored in a unit storage area of the ferroelectric memory, with the requested block of data, and if a result of the judgment by the judging unit is negative, the storage control unit performs a control to store a copy of the requested block of data into a unit storage area of the cache memory that corresponds to the count value indicated by the counter, and performs a control to replace the block of data stored in the unit storage area of the ferroelectric memory, with the requested block of data.

7. A semiconductor storage apparatus comprising:

a flash memory;

a ferroelectric memory that includes a plurality of unit storage areas in each of which a physical address of the flash memory and a logical address, which correspond to each other, are stored;

a cache memory that includes a plurality of unit storage areas in each of which a copy of a physical address of the flash memory and a copy of a logical address are stored with indication of correspondence therebetween, the cache memory including less unit storage areas in number than the ferroelectric memory;

a counter operable to indicate a count value that corresponds to one of the plurality of unit storage areas in the cache memory;

a judging unit operable to judge whether or not a copy of a logical address specified by a read request requesting to read data from the flash memory is stored in a unit storage area of the cache memory;

a storage control unit operable to, if a result of the judgment by the judging unit is negative, perform a control to read out a physical address corresponding to the logical address specified by the read request from the ferroelectric memory, read out the requested data from the flash memory using the read-out physical address, and store a copy of the logical address specified by the read request and a copy of the read-out physical address into a unit storage area in the cache memory that corresponds to the count value indicated by the counter, with indication of a correspondence between the copy of the logical address specified by the read request and the copy of the read-out physical address; and a counter control unit operable to cause the counter to update the count value each time a result of the judgment by the judging unit is negative.

8. A semiconductor storage apparatus comprising:

a first memory that stores therein first-type data;

a second memory that includes a plurality of unit storage areas in each of which a piece of second-type data, which is used to read out a block of first-type data from the first memory, is stored;

a third memory that includes a plurality of unit storage areas in each of which a copy of a piece of second-type data is stored, the third memory including less unit storage areas in number than the second memory;

a judging unit operable to judge whether or not a copy of a piece of second-type data specified by a read request requesting to read data from the first memory is stored in a unit storage area of the third memory; and a storage control unit operable to, if a result of the judgment by the judging unit is negative, perform a control to read out a piece of second-type data that is used to read out the requested block of first-type data, from the second memory, read out the requested block of first-type data from the first memory using the read-out piece of second-type data, and store a copy of the read-out piece of second-type data into a unit storage area in the third memory.

9. The semiconductor storage apparatus of claim 8 further comprising:

a counter operable to indicate a count value that corresponds to one of the plurality of unit storage areas in the third memory, wherein the storage control unit operable to perform a control to store a copy of the read-out piece of second-type data into a unit storage area in the third memory that corresponds to the count value indicated by the counter.

10. The semiconductor storage apparatus of claim 9, wherein the second-type data is management data used to manage the first memory.

11. The semiconductor storage apparatus of claim 10, wherein the management data is address data of the first memory.

12. The semiconductor storage apparatus of claim 11, wherein each piece of the management data includes a physical address of the first memory and a logical address, which correspond to each other.

13. The semiconductor storage apparatus of claim 8, wherein the first memory is a flash memory, the second memory is a ferroelectric memory, and the third memory is a static random access memory.

14. A semiconductor storage apparatus comprising:

a first memory that stores therein first-type data;

a second memory that includes a plurality of unit storage areas in each of which a piece of second-type data, which is used to rewrite a block of first-type data stored in the first memory, is stored;

a third memory that includes a plurality of unit storage areas in each of which a copy of a piece of second-type data is stored, the third memory including less unit storage areas in number than the second memory;

a counter operable to indicate a count value that corresponds to one of the plurality of unit storage areas in the third memory;

a judging unit operable to judge whether or not a copy of a block of second-type data to be replaced with a block of second-type data as requested by a rewrite request, is stored in a unit storage area of the third memory; and a storage control unit operable to, if a result of the judgment by the judging unit is positive, perform a control to replace the copy of the block of second-type data stored in a unit storage area of the third memory with a copy of the requested block of second-type data, and performs a control to replace the block of second-type data stored in a unit storage area of the second memory with the requested block of second-type data, and if a result of the judgment by the judging unit is negative, perform a control to store a copy of the requested block of second-type data into a unit storage area of the third memory that corresponds to the count value indicated by the counter, and performs a control to replace the block of second-type data stored in a unit storage area of the second memory with the requested block of second-type data; and a counter control unit operable to cause the counter to update the count value each time a result of the judgment by the judging unit is negative.

15. The semiconductor storage apparatus of claim 14, wherein the second-type data is management data used to manage the first memory.

16. The semiconductor storage apparatus of claim 15, wherein the management data is address data of the first memory.

17. The semiconductor storage apparatus of claim 16, wherein each piece of the management data includes a physical address and a logical address, which correspond to each other, of the first memory.

18. The semiconductor storage apparatus of claim 14, wherein the first memory is a flash memory, the second memory is a ferroelectric memory, and the third memory is a static random access memory.

* * * * *